(12) United States Patent
Corcoran-Tadd et al.

(10) Patent No.: US 12,708,175 B2
(45) Date of Patent: Aug. 18, 2026

(54) FOOTWEAR WITH 3-D PRINTED MIDSOLE

(71) Applicant: adidas AG, Herzogenaurach (DE)

(72) Inventors: Fionn Corcoran-Tadd, Portland, OR (US); Chris Arias, Portland, OR (US); Berin Skye B, Portland, OR (US); Andrea Nieto Perilla, Portland, OR (US); Matteo Padovani, Portland, OR (US)

(73) Assignee: adidas AG, Herzogenaurach (DE)

( * ) Notice: Subject to any disclaimer, the term of this patent is extended or adjusted under 35 U.S.C. 154(b) by 223 days.

(21) Appl. No.: 18/486,803

(22) Filed: Oct. 13, 2023

(65) Prior Publication Data

US 2024/0032649 A1 Feb. 1, 2024

Related U.S. Application Data

(62) Division of application No. 17/065,289, filed on Oct. 7, 2020, now Pat. No. 11,786,008.

(51) Int. Cl.
*B33Y 10/00* (2015.01)
*A43B 13/12* (2006.01)
(Continued)

(52) U.S. Cl.
CPC .......... *A43B 13/125* (2013.01); *A43B 13/141* (2013.01); *B29C 64/124* (2017.08); (Continued)

(58) Field of Classification Search
None
See application file for complete search history.

(56) References Cited

U.S. PATENT DOCUMENTS 354,693 A 12/1886 Dick
D29,749 S 11/1898 Bunker
(Continued)

FOREIGN PATENT DOCUMENTS

CN 101611953 A 12/2009
CN 102578760 A 7/2012
(Continued)

OTHER PUBLICATIONS

Adidas Breaks the Mould With 3D-Printed Performance Footwear, [Retrieved on Oct. 7, 2015], Retrieved from the Internet: (http://www.adidas-group.com/en/media/news-archive/press-releases/2015/adi-das-breaks-mould-3d-printed-performance-footwear/).
(Continued)

*Primary Examiner* — Mohammad M Ameen
(74) *Attorney, Agent, or Firm* — Sterne, Kessler, Goldstein & Fox P.L.L.C.

(57) ABSTRACT

Soles for articles of footwear with a three-dimensional mesh having a bottom surface defined at least partially by a plurality of nodes having a platform with a top platform surface connected to a bottom platform surface with a side surface a plurality of struts for the three-dimensional mesh directly connected to the top platform surface. In some embodiments, the side surface of two directly adjacent nodes defining the bottom surface are not connected to each other at the bottom surface. In some embodiments, the bottom platform surface of two or more adjacent nodes can merge to form a continuous integrally formed surface at the bottom surface of the three-dimensional mesh.

18 Claims, 14 Drawing Sheets

(51) Int. Cl.

| | |
|---|---|
| ***A43B 13/14*** | (2006.01) |
| ***B29C 64/124*** | (2017.01) |
| ***B29D 35/12*** | (2010.01) |
| *B33Y 80/00* | (2015.01) |

(52) U.S. Cl.

CPC ........... *B29D 35/122* (2013.01); *B33Y 10/00* (2014.12); *B33Y 80/00* (2014.12)

(56) References Cited

U.S. PATENT DOCUMENTS

| | | | |
|---|---|---|---|
| 1,111,437 | A | 9/1914 | Butterfield |
| D90,057 | S | 5/1933 | Van |
| D107,977 | S | 1/1938 | Tousley |
| D113,620 | S | 3/1939 | Cairns |
| D115,636 | S | 7/1939 | Sperry |
| 2,205,356 | A | 6/1940 | Rose et al. |
| D123,898 | S | 12/1940 | Tousley |
| D138,517 | S | 8/1944 | Meltzer |
| 2,853,809 | A | 9/1958 | Carlo et al. |
| D196,491 | S | 10/1963 | Papoutsy |
| 3,253,601 | A | 5/1966 | Scholl |
| 3,416,174 | A | 12/1968 | Novitske |
| 3,793,750 | A | 2/1974 | Bowerman |
| D241,484 | S | 9/1976 | Castano |
| D241,688 | S | 10/1976 | Johnson |
| 4,012,855 | A | 3/1977 | Gardner |
| D254,818 | S | 4/1980 | Jones |
| D255,175 | S | 6/1980 | Iwakata |
| D255,177 | S | 6/1980 | Fuzita |
| D255,178 | S | 6/1980 | Fuzita |
| D257,075 | S | 9/1980 | Amicone et al. |
| 4,271,606 | A | 6/1981 | Rudy |
| 4,297,796 | A | 11/1981 | Stirtz et al. |
| 4,309,831 | A | 1/1982 | Pritt |
| D265,605 | S | 8/1982 | Batra |
| 4,378,643 | A | 4/1983 | Johnson |
| D272,963 | S | 3/1984 | Muller et al. |
| 4,439,936 | A | 4/1984 | Clarke et al. |
| D273,631 | S | 5/1984 | Ueda |
| D278,851 | S | 5/1985 | Austin |
| D279,620 | S | 7/1985 | Ueda |
| D281,459 | S | 11/1985 | Parker |
| 4,607,440 | A | 8/1986 | Roberts et al. |
| D288,621 | S | 3/1987 | Surpuriya et al. |
| D297,383 | S | 8/1988 | Mourad et al. |
| 4,774,774 | A | 10/1988 | Allen, Jr. |
| D299,681 | S | 2/1989 | Miller et al. |
| D301,184 | S | 5/1989 | Hase |
| D301,800 | S | 6/1989 | Mitsui |
| D302,352 | S | 7/1989 | Austin |
| D303,316 | S | 9/1989 | Crowley |
| D307,817 | S | 5/1990 | Schneider |
| D312,920 | S | 12/1990 | Aveni |
| D316,324 | S | 4/1991 | Rogers |
| D321,973 | S | 12/1991 | Hatfield |
| D326,181 | S | 5/1992 | Katz et al. |
| D333,555 | S | 3/1993 | Hatfield et al. |
| D335,385 | S | 5/1993 | Kawabata |
| D335,572 | S | 5/1993 | Peterson |
| D336,775 | S | 6/1993 | Smith |
| D337,428 | S | 7/1993 | Allen, III et al. |
| 5,236,637 | A | 8/1993 | Hull |
| D339,464 | S | 9/1993 | Teague |
| 5,337,492 | A | 8/1994 | Anderie et al. |
| 5,367,791 | A | 11/1994 | Gross et al. |
| D354,693 | S | 1/1995 | Miller |
| 5,391,072 | A | 2/1995 | Lawton et al. |
| 5,423,135 | A | 6/1995 | Poole et al. |
| D370,993 | S | 6/1996 | Mangee |
| 5,529,473 | A | 6/1996 | Lawton et al. |
| D384,795 | S | 10/1997 | Hudson |
| D384,796 | S | 10/1997 | Smith, III |
| D387,698 | S | 12/1997 | Hatfield et al. |
| D389,993 | S | 2/1998 | Ryan |
| D390,348 | S | 2/1998 | Meyer et al. |
| D390,690 | S | 2/1998 | Murai et al. |
| D391,747 | S | 3/1998 | Avar |
| D393,341 | S | 4/1998 | Marshall et al. |
| D394,342 | S | 5/1998 | Schneider |
| D394,741 | S | 6/1998 | Gaudio |
| D395,340 | S | 6/1998 | Tresser |
| D395,343 | S | 6/1998 | Lozano |
| D395,740 | S | 7/1998 | Cass |
| D395,743 | S | 7/1998 | Ryan |
| D397,546 | S | 9/1998 | Merceron |
| 5,799,417 | A | 9/1998 | Burke et al. |
| D400,345 | S | 11/1998 | Teaque |
| D401,745 | S | 12/1998 | Greenberg |
| D401,747 | S | 12/1998 | Cessor |
| D402,450 | S | 12/1998 | Munns |
| 5,862,614 | A | 1/1999 | Koh |
| D404,897 | S | 2/1999 | Marshall |
| D407,892 | S | 4/1999 | Gaudio |
| D408,972 | S | 5/1999 | Greenberg |
| D411,910 | S | 7/1999 | Cessor |
| D412,050 | S | 7/1999 | Chassaing |
| D412,239 | S | 7/1999 | Sorofman |
| 5,930,916 | A | 8/1999 | Connor |
| 5,983,529 | A | 11/1999 | Serna |
| 5,985,383 | A | 11/1999 | Allen et al. |
| 6,014,821 | A | 1/2000 | Yaw |
| D420,208 | S | 2/2000 | Birkenstock |
| 6,021,588 | A | 2/2000 | Alviso |
| 6,076,283 | A | 6/2000 | Boie |
| D432,762 | S | 10/2000 | Weege |
| D432,763 | S | 10/2000 | Smith, III |
| D433,215 | S | 11/2000 | Smith, III |
| D442,768 | S | 5/2001 | Matis |
| 6,259,962 | B1 | 7/2001 | Gothait |
| 6,367,172 | B2 | 4/2002 | Hernandez |
| D458,441 | S | 6/2002 | Gillespie |
| D459,865 | S | 7/2002 | Urie et al. |
| D461,040 | S | 8/2002 | Urie et al. |
| D480,540 | S | 10/2003 | Hoyt et al. |
| 6,665,958 | B2 | 12/2003 | Goodwin |
| D485,662 | S | 1/2004 | Magro |
| D488,916 | S | 4/2004 | McClaskie |
| 6,763,611 | B1 | 7/2004 | Fusco |
| D497,707 | S | 11/2004 | Lee |
| D500,399 | S | 1/2005 | Fuerst |
| D515,791 | S | 2/2006 | McClaskie |
| D529,697 | S | 10/2006 | Earle |
| D536,163 | S | 2/2007 | McClaskie |
| D538,519 | S | 3/2007 | McClaskie |
| D552,337 | S | 10/2007 | Parekh et al. |
| D556,988 | S | 12/2007 | Horne et al. |
| D561,438 | S | 2/2008 | Belley |
| D561,439 | S | 2/2008 | Schoenborn et al. |
| D561,443 | S | 2/2008 | Robinson, Jr. et al. |
| 7,383,647 | B2 | 6/2008 | Chan et al. |
| D572,462 | S | 7/2008 | Hatfield et al. |
| D577,883 | S | 10/2008 | Link |
| 7,438,846 | B2 | 10/2008 | John |
| D586,994 | S | 2/2009 | Chang |
| D593,741 | S | 6/2009 | Vico et al. |
| D608,991 | S | 2/2010 | Lamont |
| 7,676,955 | B2 | 3/2010 | Dojan et al. |
| 7,704,430 | B2 | 4/2010 | Johnson et al. |
| D616,640 | S | 6/2010 | Werman |
| D621,143 | S | 8/2010 | Lamont |
| 7,892,474 | B2 | 2/2011 | Shkolnik et al. |
| D638,616 | S | 5/2011 | Gibson |
| 8,110,135 | B2 | 2/2012 | El-Siblani |
| D659,358 | S | 5/2012 | Van Zyll De Jong et al. |
| 8,191,284 | B2 | 6/2012 | Cho |
| D666,391 | S | 9/2012 | Van Zyll De Jong et al. |
| D672,949 | S | 12/2012 | Bramani et al. |
| D686,402 | S | 7/2013 | Portzline |
| 8,522,454 | B2 | 9/2013 | Schindler et al. |
| D691,359 | S | 10/2013 | Della Valle et al. |
| D695,502 | S | 12/2013 | Miner |
| D696,004 | S | 12/2013 | Della Valle et al. |
| D696,505 | S | 12/2013 | Miner |

(56) References Cited

U.S. PATENT DOCUMENTS

D697,294 S 1/2014 Miner
D702,028 S 4/2014 Truelsen
D702,428 S 4/2014 Hlavacs
D703,425 S 4/2014 Lee
8,739,639 B2 6/2014 Owings et al.
D707,933 S 7/2014 McCourt
D709,274 S 7/2014 Roulo
8,776,396 B2 7/2014 Huynh
D711,637 S 8/2014 Miner
D713,628 S 9/2014 Greenspan
D741,586 S 10/2015 Truelsen
D743,154 S 11/2015 Nethongkome
D744,212 S 12/2015 Boudreau et al.
9,205,601 B2 12/2015 Desimone et al.
9,211,678 B2 12/2015 Desimone et al.
9,216,546 B2 12/2015 Desimone et al.
D747,860 S 1/2016 De Costa Pereira Machado
D751,797 S 3/2016 Slimane
9,320,316 B2 4/2016 Guyan et al.
9,453,142 B2 9/2016 Rolland et al.
D769,593 S 10/2016 Chang
D773,162 S 12/2016 Lane, III et al.
D779,174 S 2/2017 De Montgolfier
D783,973 S 4/2017 Anceresi
D784,666 S 4/2017 Lok
D789,060 S 6/2017 Guyan et al.
D790,821 S 7/2017 Beers et al.
D792,689 S 7/2017 Mokos
D796,170 S 9/2017 Raysse
D796,806 S 9/2017 Durand
D798,561 S 10/2017 Ford
D799,184 S 10/2017 Chang
D800,432 S 10/2017 Klein
D802,896 S 11/2017 Rademacher et al.
D804,792 S 12/2017 De Montgolfier et al.
D809,752 S 2/2018 Campbell
D812,882 S 3/2018 Jenkins et al.
9,930,929 B2 4/2018 Cooper et al.
D816,961 S 5/2018 Bardea
D819,310 S 6/2018 Lashmore
D822,351 S 7/2018 Dealmeida
10,010,133 B2 7/2018 Guyan
10,010,134 B2 7/2018 Guyan
10,016,013 B2 7/2018 Kormann et al.
10,034,516 B2 7/2018 Gheorghian et al.
D825,163 S 8/2018 Montross et al.
D825,165 S 8/2018 Gibson et al.
10,039,343 B2 8/2018 Guyan
D829,425 S 10/2018 Albrecht et al.
D831,315 S 10/2018 Mahoney
D831,317 S 10/2018 Jenkins et al.
10,104,934 B2 10/2018 Guyan
D836,892 S 1/2019 Jenkins et al.
D841,299 S 2/2019 Nikolic
D841,300 S 2/2019 Albrecht et al.
D841,301 S 2/2019 Albrecht et al.
D841,964 S 3/2019 Kaiserswerth
10,231,511 B2 3/2019 Guyan et al.
D844,953 S 4/2019 Chen et al.
D845,610 S 4/2019 Mayden et al.
10,259,171 B2 4/2019 Robeson et al.
D847,481 S 5/2019 Albrecht et al.
D848,716 S 5/2019 Shyllon
D849,382 S 5/2019 Jenkins et al.
D850,083 S 6/2019 Jenkins et al.
D851,873 S 6/2019 Maier
D854,300 S 7/2019 Evans
D855,957 S 8/2019 Evans
D857,350 S 8/2019 Hardy
D857,360 S 8/2019 Hardy
D857,362 S 8/2019 Thompson
D858,066 S 9/2019 Hatfield
D859,801 S 9/2019 Jenkins et al.
D860,614 S 9/2019 Bishoff
D862,051 S 10/2019 Goussev et al.
D862,866 S 10/2019 Albrecht et al.
10,426,226 B2 10/2019 Guyan et al.
10,434,706 B2 10/2019 Robeson et al.
D869,830 S 12/2019 Lucas et al.
D871,033 S 12/2019 Nikolic
D872,426 S 1/2020 Taylor
D873,546 S 1/2020 Henrichot
D876,056 S 2/2020 Henrichot
D878,016 S 3/2020 Henrichot
D879,428 S 3/2020 Braun et al.
D879,434 S 3/2020 Fick et al.
10,575,588 B2 3/2020 Perrault et al.
D880,120 S 4/2020 Fick et al.
D880,122 S 4/2020 Fick et al.
D880,131 S 4/2020 Fick et al.
D882,227 S 4/2020 Braun et al.
10,639,861 B2 5/2020 Le et al.
D890,485 S 7/2020 Perrault et al.
2002/0078598 A1 6/2002 Bell
2004/0087230 A1 5/2004 Wildeman
2006/0201028 A1 9/2006 Chan et al.
2007/0011914 A1 1/2007 Keen et al.
2007/0043582 A1 2/2007 Peveto et al.
2008/0289218 A1 11/2008 Nakano
2009/0126225 A1 5/2009 Jarvis
2009/0139112 A1 6/2009 Garneau
2009/0183392 A1 7/2009 Shane
2009/0293309 A1 12/2009 Keating et al.
2010/0122471 A1 5/2010 Edington et al.
2010/0170106 A1 7/2010 Brewer et al.
2010/0199520 A1 8/2010 Dua et al.
2010/0251565 A1 10/2010 Litchfield et al.
2010/0281714 A1 11/2010 Carboy et al.
2011/0099855 A1 5/2011 Cho
2012/0117825 A9 5/2012 Jarvis
2012/0178259 A1 7/2012 Miyazaki et al.
2012/0180335 A1 7/2012 Mahoney
2012/0186107 A1 7/2012 Crary et al.
2013/0118036 A1 5/2013 Gibson
2013/0145653 A1 6/2013 Bradford
2013/0171019 A1 7/2013 Gessler et al.
2013/0292862 A1 11/2013 Joyce
2013/0295212 A1 11/2013 Chen et al.
2014/0020191 A1 1/2014 Jones et al.
2014/0026773 A1 1/2014 Miller
2014/0029030 A1 1/2014 Miller
2014/0109441 A1 4/2014 Mcdowell et al.
2014/0150297 A1 6/2014 Holmes et al.
2014/0182170 A1 7/2014 Wawrousek et al.
2014/0223783 A1 8/2014 Wardlaw et al.
2014/0226773 A1 8/2014 Toth et al.
2014/0259779 A1 9/2014 Hashish et al.
2014/0259787 A1 9/2014 Guyan et al.
2014/0259788 A1 9/2014 Dojan et al.
2014/0259789 A1 9/2014 Dojan et al.
2014/0299009 A1 10/2014 Miller et al.
2014/0300675 A1 10/2014 Miller et al.
2014/0300676 A1 10/2014 Miller et al.
2014/0310991 A1 10/2014 Greene et al.
2015/0000161 A1 1/2015 Peyton et al.
2015/0033577 A1 2/2015 Dahl et al.
2015/0033579 A1 2/2015 Barnes et al.
2015/0033581 A1 2/2015 Barnes et al.
2015/0089841 A1 4/2015 Smaldone et al.
2015/0181976 A1 7/2015 Cooper et al.
2015/0223560 A1 8/2015 Wawrousek et al.
2015/0245686 A1 9/2015 Cross
2015/0331402 A1 11/2015 Lin et al.
2015/0351493 A1 12/2015 Ashcroft et al.
2015/0360419 A1 12/2015 Willis et al.
2016/0051009 A1 2/2016 Kormann et al.
2016/0122493 A1 5/2016 Farris et al.
2016/0137839 A1 5/2016 Rolland et al.
2016/0160077 A1 6/2016 Rolland et al.
2016/0180440 A1 6/2016 Dibenedetto et al.
2016/0288376 A1 10/2016 Sun et al.
2016/0295971 A1 10/2016 Arnese et al.
2016/0324260 A1 11/2016 Guyan
2016/0324261 A1 11/2016 Guyan

(56) References Cited

U.S. PATENT DOCUMENTS

| | | | |
|---|---|---|---|
| 2016/0360828 A1 | 12/2016 | Guyan | |
| 2016/0374428 A1 | 12/2016 | Kormann et al. | |
| 2017/0129167 A1 | 5/2017 | Castanon | |
| 2017/0129169 A1 | 5/2017 | Batchelder et al. | |
| 2017/0150778 A1 | 6/2017 | Youngs et al. | |
| 2018/0014606 A1 | 1/2018 | Mokos | |
| 2018/0070736 A1 | 3/2018 | Achten et al. | |
| 2018/0103719 A1 | 4/2018 | Chen | |
| 2018/0126630 A1 | 5/2018 | Panzer et al. | |
| 2018/0243976 A1 | 8/2018 | Feller | |
| 2018/0271211 A1* | 9/2018 | Perrault | B33Y 50/00 |
| 2018/0271213 A1 | 9/2018 | Perrault et al. | |
| 2018/0290374 A1 | 10/2018 | Willis et al. | |
| 2018/0303199 A1* | 10/2018 | Guyan | A43B 7/1405 |
| 2018/0368518 A1 | 12/2018 | Re et al. | |
| 2019/0069632 A1 | 3/2019 | Meschter | |
| 2019/0098960 A1 | 4/2019 | Weisskopf et al. | |
| 2019/0160733 A1 | 5/2019 | Mirkin et al. | |
| 2019/0223543 A1 | 7/2019 | Tamm et al. | |
| 2019/0223551 A1 | 7/2019 | Hoffer et al. | |
| 2019/0269200 A1 | 9/2019 | Tseng | |
| 2019/0289960 A1 | 9/2019 | Loveder | |
| 2020/0093221 A1 | 3/2020 | Caldwell et al. | |
| 2020/0156308 A1 | 5/2020 | Ramos et al. | |
| 2020/0329815 A1 | 10/2020 | Schmid | |
| 2021/0195989 A1 | 7/2021 | Iwasa et al. | |
| 2021/0195995 A1 | 7/2021 | Sakamoto et al. | |

FOREIGN PATENT DOCUMENTS

| | | | |
|---|---|---|---|
| CN | 203378623 | U | 1/2014 |
| CN | 209391169 | U | 9/2019 |
| CN | 209403686 | U | 9/2019 |
| CN | 110859355 | A | 3/2020 |
| EP | 0526892 | A2 | 2/1993 |
| EP | 2564719 | A1 | 3/2013 |
| EP | 3013171 | A1 | 1/2014 |
| EP | 2424398 | B1 | 12/2015 |
| EP | 3165109 | A1 | 5/2017 |
| ES | 2442448 | A1 | 2/2014 |
| ES | 2578730 | A1 | 7/2016 |
| JP | 2002238609 | A | 8/2002 |
| JP | 2011251190 | A | 12/2011 |
| JP | 2014151201 | A | 8/2014 |
| JP | 3192899 | U | 9/2014 |
| WO | 2010126708 | A2 | 11/2010 |
| WO | 2014008331 | A2 | 1/2014 |
| WO | 2014009587 | A1 | 1/2014 |
| WO | 2014015037 | A2 | 1/2014 |
| WO | 2014100462 | A1 | 6/2014 |
| WO | 2015164234 | A1 | 10/2015 |
| WO | 015169942 | A1 | 11/2015 |
| WO | 2015169941 | A1 | 11/2015 |
| WO | 2016066750 | A1 | 5/2016 |
| WO | 2017210298 | A1 | 12/2017 |
| WO | 2021169804 | A1 | 9/2021 |

OTHER PUBLICATIONS

Green, D., Adidas is finally bringing 3D-printed shoes into the mainstream, Business Insider.com, Dennis Green, Retrieved from the Internet: (URL:https://www.businessinsider.com/adidas-releases-futurecraft-4d-shoe-2017-4/commerce-on-business-insider), (Year: 2017).

Janusziewicz, R., et al., "Layerless Fabrication With Continuous Liquid Interface Production," PNAS 113 (42):11703-11708, University of Illinois (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t- racking_source=curated_galleries_list) 2018, 10 pages.

Panetta., et al., "Elastic Textures for Additive Fabrication," ACM Transactions on Graphics 34(4), Article No. 135, (Aug. 2015).

Pearson, D., Adidas is giving Olympic athletes its first-ever 3D-printed shoes,Highsnobiety.com, Retrieved from the Internet: (URL:https://www.highsnobiety.com/2016/08/11/adidas-3d-printed-shoes-olympics/), (Year: 2016).

Reebok Flexagon, Retrieved from the Internet (URL: https://www.reebok.com/us/reebok-flexagon/CN2583.html), 2018.

Richard, B., Here's what 3D printed Future Craft adidas Yeezy boosts would look like Yeezys geared up for the future Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228):1349-1352, American Association for the Advancement of Science (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring--a-6-month-outsole-warranty/), (Year: 2018), 11 pages.

* cited by examiner 1230
1192
1260
1194
1250
1120
1200

FOOTWEAR WITH 3-D PRINTED MIDSOLE

CROSS-REFERENCE TO RELATED APPLICATIONS

This application is a divisional of U.S. patent application Ser. No. 17/065,289, filed Oct. 7, 2020, which is incorporated by reference herein in its entirety.

FIELD

The described embodiments generally relate to soles for articles of footwear. More particularly, described embodiments relate to 3-D printed midsoles for articles of footwear.

BACKGROUND

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing shoes that provide proper cushioning and support, the soreness and fatigue associated with every day activity is more acute, and its onset may be accelerated. This discomfort for the wearer may diminish the incentive for further activity. Equally important, inadequately cushioned footwear can lead to injuries such as blisters; muscle, tendon, and ligament damage; and bone stress fractures. Improper footwear can also lead to other ailments, including back pain.

Individuals are often concerned with the amount of cushioning an article of footwear provides. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The sole of an article of footwear functions, in part, to provide cushioning for the wearer's foot and to protect it from these forces.

Proper footwear should be durable, comfortable, and provide other beneficial characteristics for an individual. Therefore, a continuing need exists for innovations in footwear.

BRIEF SUMMARY

A first aspect (1) of the present application is directed to a sole for an article of footwear, the sole including a three-dimensional mesh including: a plurality of interconnected unit cells, each interconnected unit cell including a plurality of struts defining a three-dimensional shape and a plurality of nodes at which one or more struts are connected; a top surface; and a bottom surface opposite the top surface, the bottom surface defined at least partially by a plurality of the nodes, where each of the plurality of nodes defining the bottom surface includes a platform, the platform including: a top platform surface, a bottom platform surface, a side surface connecting the top platform surface and the bottom platform surface, and a plurality of struts directly connected to the top platform surface.

In a second aspect (2), the side surface of two directly adjacent nodes defining the bottom surface according to the first aspect (1) are not connected via a strut at the bottom surface.

In a third aspect (3), the side surface of two directly adjacent nodes defining the bottom surface according to the first aspect (1) or the second aspect (2) are not connected to each other at the bottom surface.

In a fourth aspect (4), the plurality of nodes defining the bottom surface according to any one of aspects (1)-(3) do not include a strut connected to the side surface of the platform.

In a fifth aspect (5), the plurality of struts directly connected to the top platform surface according to any one of aspects (1)-(4) do not define a portion of the side surface of the platform.

In a sixth aspect (6), the top platform surface according to any one of aspects (1)-(5) includes a top perimeter edge, the bottom platform surface includes a bottom perimeter edge, and the side surface connects the top perimeter edge and the bottom perimeter edge.

In a seventh aspect (7), the top platform surface according to any one of aspects (1)-(6) includes a central area in which the plurality of struts are directly connected to the top platform surface and a perimeter area disposed around the central area. In an eighth aspect (8), the plurality of nodes defining the bottom surface according to any one of aspects (1)-(7) include: a first node including a first platform with a first bottom platform surface having a first surface area, and a second node directly adjacent the first node and including a second platform with a second bottom platform surface having a second surface area 10% or more greater than the first surface area.

In a ninth aspect (9), the sole according to the eighth aspect (8) further includes a third node directly adjacent the second node and including a third platform with a third bottom platform surface having a third surface area 10% or more greater than the second surface area.

In a tenth aspect (10), the plurality of nodes defining the bottom surface according to any one of aspects (1)-(7) include: a first node including a first platform having a first bottom platform surface, a second node directly adjacent the first node and including a second platform having a second bottom platform surface, and a third node directly adjacent the second node and including a third platform having a third bottom platform surface, where the third bottom platform surface and the second bottom platform surface form a continuous integrally formed surface.

In an eleventh aspect (11), the bottom surface of the three-dimensional mesh according to the tenth aspect (10) is further defined by a skin including: a top skin surface, a bottom skin surface opposite the top skin surface, and a plurality of struts for a plurality of unit cells directly connected to the top skin surface, where the continuous integrally formed surface defines a portion of the bottom skin surface.

In a twelfth aspect (12), the skin and the first node according to the eleventh aspect (11) are not connected to each other at the bottom surface of the three-dimensional mesh.

In a thirteenth aspect (13), the sole according to of any one of aspects (1)-(12) further includes an outsole coupled to the bottom platform surface of the plurality of nodes defining the bottom surface of the three-dimensional mesh.

In a fourteenth aspect (14), the bottom platform surface according to any one of aspects (1)-(7) includes a flat surface.

A fifteenth aspect (15) of the present application is directed to a sole for an article of footwear, the sole including a three-dimensional mesh including: a plurality of interconnected unit cells, each interconnected unit cell including a plurality of struts defining a three-dimensional shape and a plurality of nodes at which one or more struts are connected; a top surface; and a bottom surface opposite the top surface, the bottom surface defined by a first skin, a second skin, and a plurality of the nodes, where the first skin includes: a first top skin surface, a first bottom skin surface opposite the first top skin surface, and a plurality of struts for a plurality of the unit cells directly connected to the first top skin surface, where the second skin includes: a second top skin surface, a second bottom skin surface opposite the second top skin surface, and a plurality of struts for a plurality of the unit cells directly connected to the second top skin surface, where each of the plurality of nodes defining the bottom surface includes a platform, the platform including: a top platform surface and a bottom platform surface opposite the top platform surface, and where the first skin, the second skin, and the plurality of nodes are not connected to each other at the bottom surface of the three-dimensional mesh.

In a sixteenth aspect (16), the first skin according to the fifteenth aspect (15) is located in a forefoot portion of the three-dimensional mesh and the second skin according to the fifteenth aspect (15) is located in a heel portion of the three-dimensional mesh.

In a seventeenth aspect (17), the first skin according to the fifteenth aspect (15) or the sixteenth aspect (16) is located in a first high-wear area on the bottom surface of the three-dimensional mesh and the second skin according to the fifteenth aspect (15) or the sixteenth aspect (16) is located in a second high-wear area on the bottom surface of the three-dimensional mesh.

In an eighteenth aspect (18), the first skin according to any one of aspects (15)-(17) includes a portion located on a lateral side of the bottom surface of the three-dimensional mesh and the second skin according to any one of aspects (15)-(17) includes a portion located on a medial side of the bottom surface of the three-dimensional mesh.

In a nineteenth aspect (19), the sole according to any one of aspects (15)-(18) further includes an outsole coupled to the first bottom skin surface, the second bottom skin surface, and the bottom platform surface of the platforms.

In a twentieth aspect (20), the sole according to any one aspects (15)-(18) further includes an outsole coupled to the first bottom skin surface and the second bottom skin surface.

In a twenty-first aspect (21), the outsole according to the twentieth aspect (20) includes a first outsole piece directly coupled to the first bottom skin surface and a second outsole piece directly coupled to the second bottom skin surface.

A twenty-second aspect (22) of the present application is directed to a method of making a sole for an article of footwear, the method including 3-D printing a three-dimensional mesh for the sole including a plurality of interconnected unit cells, each interconnected unit cell including a plurality of struts defining a three-dimensional shape and a plurality of nodes at which one or more struts are connected, where 3-D printing the three-dimensional mesh includes: printing a plurality of the plurality of nodes on a build surface of a build plate, each of the plurality of nodes including a platform, the platform including: a bottom platform surface in contact with the build surface, a top platform surface opposite the a bottom platform surface, and a side surface connecting the top platform surface and the bottom platform surface; and printing a plurality of the plurality of struts on the top surface, where the plurality of struts define a portion of the interconnected unit cells.

In a twenty-third aspect (23), 3-D printing the three-dimensional mesh according to the twenty-second embodiment (22) includes a continuous liquid interface production process.

DETAILED DESCRIPTION

Figure 1:
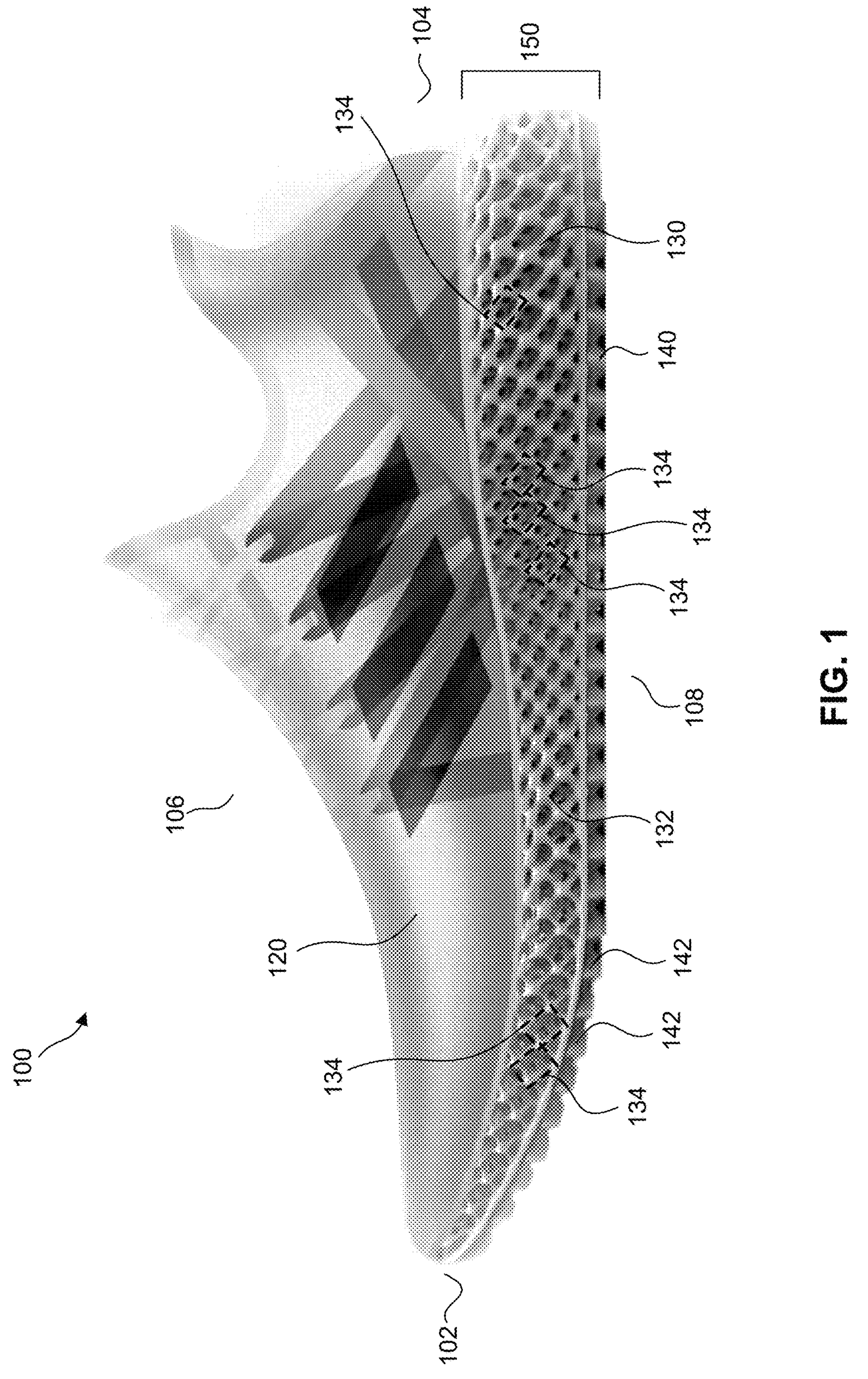
FIG. 1 is a side view of an article of footwear according to some embodiments.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An article of footwear has many purposes. Among other things, an article of footwear may cushion a wearer's foot, support a wearer's foot, protect a wearer's foot (e.g., from injury), and optimize the performance of a wearer's foot. Each of these purposes, alone or in combination, provides for a comfortable article of footwear suitable for use in a variety of scenarios (e.g., exercise and every day activities). The features of an article of footwear (e.g., shape, components, and materials used to make footwear) may be altered to produce desired characteristics, for example, cushioning, support, stability, ride, propulsion, and weight characteristics.

Stability provided by an article of footwear may protect a wearer's foot from injury, such as spraining his or her ankle.

Propulsion provided by an article of footwear may optimize the performance of a wearer's foot by, for example, maximizing the energy transfer from the individual's foot to the surface his or her foot is in contact with (e.g., the ground) via the article of footwear. Maximizing the energy transfer between the individual's foot and a surface (i.e., reducing energy lost via and/or absorbed by an article of footwear) may help an athlete, for example, accelerate faster, maintain a higher maximum speed, change directions faster, and jump higher. Cushioning and ride characteristics provided by an article of footwear may provide comfort for an individual during an athletic or everyday activity. Lightweight footwear may be conformable for an individual, and for individuals competing in an athletic activity, such as running or biking, may provide a competitive edge due to the decreased weight the individual carries on his or her feet.

Midsoles described herein include a three-dimensional mesh with a bottom surface tailored to create desired characteristics for an article of footwear. The structure of the three-dimensional mesh defining the bottom surface can be tailored to, among other things, minimize the weight of the midsole, facilitate the attachment of an outsole to the bottom surface, and enhance flexibility of the bottom surface. Enhanced flexibility of the bottom surface can, in some cases, benefit cushioning and/or ride characteristics of the article of footwear.

The bottom surface of midsoles described herein can minimize the weight of the midsole through efficient use of surface area on the bottom surface. This efficient use of surface area can keep the weight of midsole low while also providing an optimized surface for attachment of an outsole. In some embodiments, efficient use of surface area can be accomplished using a plurality of bottom surface features that are not connected to each other at the bottom surface. The disconnected nature of the bottom surface of midsoles described herein can enhance the flexibility of the midsole by providing a large degree of freedom of motion for the midsole at bottom surface. By utilizing various elements disconnected at the bottom surface, these elements are free to move relative to each other at the bottom surface, unless connected via another component such as an outsole. The use of disconnected elements as described herein can also enhance the ability of the bottom surface to provide traction. By providing bottom surface features that are free to move relative to each other at the bottom surface, the bottom surface features can conform to ground surface contours and enhance the traction provided by the bottom surface.

As used herein, the term "three-dimensional mesh" means a three-dimensional structure comprising interconnected structural members defining a plurality of unit cells. The structural members, and thus the unit cells, can be connected at nodes. The unit cells can be arranged in a lattice configuration. For example, the interconnected structural members can be struts that are connected at nodes and that define unit cells arranged in a lattice configuration. Exemplary lattice configurations include, but are not limited to basic cubic lattices, body-centered cubic lattices, face-centered cubic lattices, and lattice configurations derived from these lattice types.

Midsoles including a three-dimensional mesh as discussed herein can be manufactured using one or more additive manufacturing methods. Additive manufacturing methods can allow for fabrication of three-dimensional objects without the need for a mold. By reducing or eliminating the need for molds, additive manufacturing methods can reduce costs for a manufacturer, and in turn a consumer, of a product (e.g., a shoe). Integral manufacturing of a midsole using additive manufacturing can make the assembly of separate elements of the midsole unnecessary. Similarly, an additively manufactured midsole can be fabricated from single material, which may facilitate easy recycling of the midsole.

Further, since molds may not be required, additive manufacturing methods facilitate customization of products. Additive manufacturing methods can be leveraged to provide customized and affordable footwear for individuals. Exemplary additive manufacturing techniques, which can also be referred to as 3-D printing techniques, include for example, selective laser sintering, selective laser melting, selective heat sintering, stereo lithography, or fused deposition modeling. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2564719, EP 2424398, and US 2012/0117825. In some embodiments, the additive manufacturing process can include a continuous liquid interface production process. For example, the additive manufacturing process can include a continuous liquid interface production process as described in U.S. Pat. No. 9,453,142, issued on Sep. 27, 2016, which is hereby incorporated in its entirety by reference thereto. In some embodiments, 3-D printing a three-dimensional mesh can include 3-D printing the mesh in an intermediate green state, shaping the mesh in the green state, and curing the green mesh in its final shape.

Techniques for producing an intermediate object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, uS Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also US Patent Nos. 10,259,171 and 10,434, 706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP can be preferred, it will be appreciated that other additive manufacturing techniques, such as jet printing (see, e.g., U.S. Pat. No. 6,259,962 to Gothait and US Patent App. Serial No. US 2020/0156308 to Ramos et al.) can also be used.

The bottom surface of the three-dimensional meshes described herein can facilitate the ease of manufacturing a midsole using an additive manufacturing process. In particular, the surface area of the bottom surface can facilitate additive manufacturing by providing an optimized surface on which the three-dimensional mesh can be printed. The surface area of the bottom surface can reduce the chance of misprints and other manufacturing defects, for example, detachment between the bottom surface and a build surface of a build plate.

For some additive manufacturing processes, for example, continuous liquid interface production processes, detachment between the bottom surface of a 3-D printed part and the build surface of a build plate can be problematic unless the bottom surface is engineered to avoid detachment. Direct attachment between the cured resin and the build surface holds the 3-D printed part on the build surface and prevents the 3-D printed part from detaching during printing. The amount of bottom surface area attached and directly connected to the build surface, along with other printing variables like printing speed, the mass of the 3-D printed part, and the mass distribution of the 3-D printed part dictate the chance of detachment. Midsoles described herein can include a three-dimensional mesh with a bottom surface tailored to avoid detachment during a continuous liquid interface production process. Nodes having platforms with bottom platform surfaces as described herein and/or skins having bottom skin surfaces as described herein provide a bottom surface that resists detachment during a continuous liquid interface production process. This in turn can increase the efficiency and repeatability of a continuous liquid interface production process for making 3-D printed midsoles.

Figure 2:
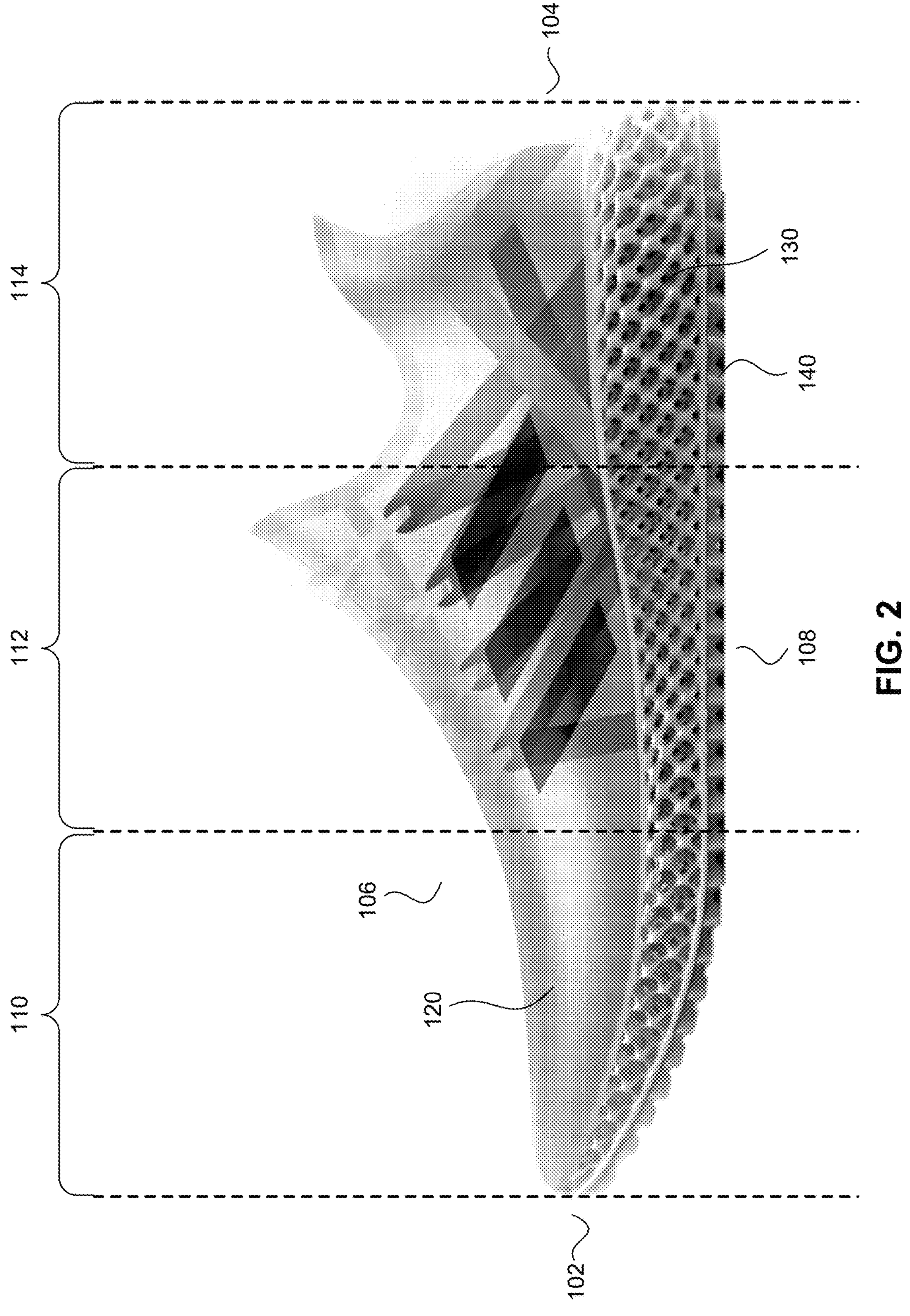
FIG. 2 is a side view of an article of footwear according to some embodiments showing portions of the article of footwear.

FIGS. 1 and 2 show an article of footwear 100 according to some embodiments. Article of footwear 100 can include an upper 120 coupled to a midsole 130. Article of footwear 100 includes a forefoot end 102, a heel end 104, a medial side 106, and a lateral side 108 opposite medial side 106. Also, as shown for example in FIG. 2, article of footwear 100 includes a forefoot portion 110, a midfoot portion 112, and a heel portion 114. Portions 110, 112, and 114 are not intended to demarcate precise areas of article of footwear 100. Rather, portions 110, 112, and 114 are intended to represent general areas of article of footwear 100 that provide a frame of reference. Although portions 110, 112, and 114 apply generally to article of footwear 100, references to portions 110, 112, and 114 also may apply specifically to upper 120 or midsole 130, or individual components of upper 120 or midsole 130.

As shown for example in FIG. 1, midsole 130 can include a three-dimensional mesh 132 composed of a plurality of interconnected unit cells 134. In some embodiments, article of footwear 100 can include an outsole 140 coupled to midsole 130. Together, midsole 130 and outsole 140 can define a sole 150 of article of footwear 100. In some embodiments, outsole 140 can be directly manufactured (e.g., 3-D printed) on the bottom side of midsole 130. In some embodiments, outsole 140 and midsole 130 can be manufactured in one manufacturing process (e.g., one 3-D printing process) and no bonding, e.g. via adhesives, may be necessary. In some embodiments, outsole 140 can include a plurality of protrusions 142 to provide traction for article of footwear 100. Protrusions 142 may be referred to as tread. Midsole 130 can be any of the midsoles described herein, for example, midsole 300 or 1100. Outsole 140 can be any of the outsoles described herein, for example, outsole 900 or 1190.

Upper 120 and sole 150 can be configured for a specific type of footwear, including, but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe. Moreover, sole 150 can be sized and shaped to provide a desired combination of cushioning, stability, propulsion, and ride characteristics to article of footwear 100. The term "ride" may be used herein in describing a sense of smoothness or flow occurring during a gait cycle including heel strike, midfoot stance, toe off, and the transitions between these stages. In some embodiments, sole 150 can provide particular ride features including, but not limited to, appropriate control of pronation and supination, support of natural movement, support of unconstrained or less constrained movement, appropriate management of rates of change and transition, and combinations thereof.

Sole 150 and portions thereof (e.g., midsole 130 and outsole 140) can comprise material(s) for providing desired cushioning, ride, propulsion, support, and stability. Suitable materials for sole 150 (e.g., midsole 130 and/or outsole 140) include, but are not limited to, a foam, a rubber, ethyl vinyl acetate (EVA), thermoplastic polyurethane (TPU), expanded thermoplastic polyurethane (eTPU), polyether block amide (PEBA), expanded polyether block amide (ePEBA), thermoplastic rubber (TPR), and a thermoplastic polyurethane (PU). In some embodiments, the foam can comprise, for example, an EVA based foam or a PU based foam and the foam can be an open-cell foam or a closed-cell foam. In some embodiments, midsole 130 and/or outsole 140 can comprise elastomers, thermoplastic elastomers (TPE), foam-like plastics, gel-like plastics, and combinations thereof. In some embodiments, midsole 130 and/or outsole 140 can comprise polyolefins, for example polyethylene (PE), polystyrene (PS) and/or polypropylene (PP). In some embodiments, sole 150 can include a shank or torsion bar. In such embodiments, the shank or torsion bar can be made of a Nylon polymer.

Sole 150 and portions thereof (e.g., midsole 130 and outsole 140) can be formed using an additive manufacturing process, including, but not limited to, selective laser sintering, selective laser melting, selective heat sintering, stereo lithography, or fused deposition modeling. In some embodiments, midsole 130 and/or outsole 140 can be formed using an additive manufacturing process including a continuous liquid interface production process. For example, the additive manufacturing process can include a continuous liquid interface production process as described in U.S. Pat. No. 9,453,142, issued on Sep. 27, 2016, which is hereby incorporated in its entirety by reference thereto. In some embodiments, midsole 130 and outsole 140 can be formed as a single piece via an additive manufacturing process. In such embodiments, midsole 130 and outsole 140 can be a single integrally formed piece.

In some embodiments, outsole 140 can be formed by injection molding, blow molding, compression molding, rotational molding, or dipping. In such embodiments, midsole 130 and outsole 140 can be discrete components that are formed separately and attached. In some embodiments, midsole 130 can be attached to outsole 140 via, for example, but not limited to, adhesive bonding, stitching, welding, or a combination thereof. In some embodiments, midsole 130 can be attached to outsole 140 via an adhesive disposed between midsole 130 and outsole 140. Similarly, midsole 130 can be attached to upper 120 via, for example, but not limited to, adhesive bonding, stitching, welding, or a combination thereof.

Figure 3:
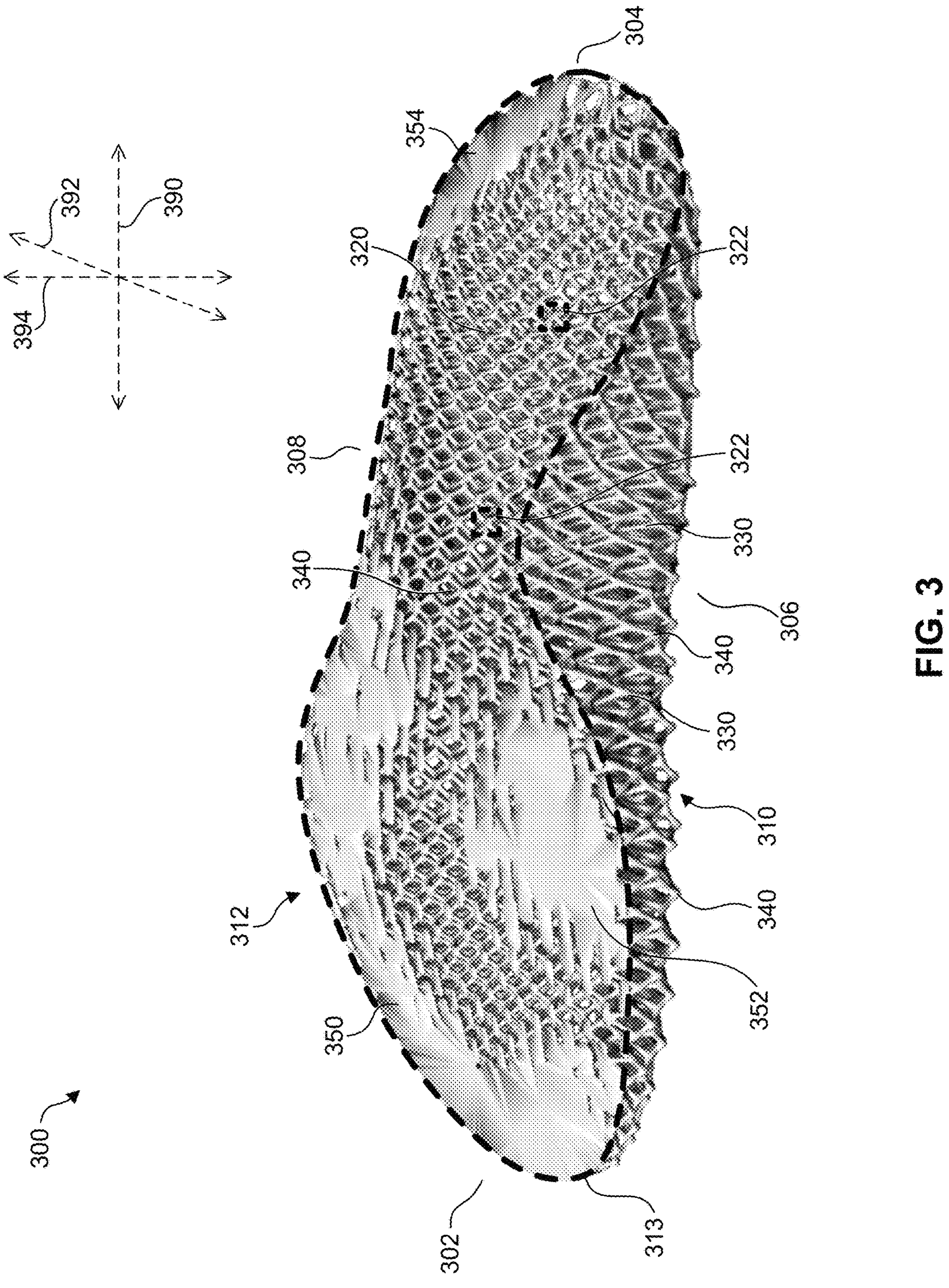
FIG. 3 is a perspective view of a midsole according to some embodiments.

FIG. 3 shows a midsole 300 according to some embodiments. Midsole 300 includes a forefoot end 302, a heel end 304, a medial side 306, a lateral side 308, a top surface 310, and a bottom surface 312 opposite top surface 310. A longitudinal direction 390 of midsole 300 extends between forefoot end 302 and heel end 304. Longitudinal direction 390 includes a forward longitudinal direction ("forward direction") extending from heel end 304 to forefoot end 302 and a rearward longitudinal direction ("rearward direction") extending from forefoot end 302 to heel end 304. A transverse direction 392 of midsole 300 extends between medial side 306 and lateral side 308 of midsole 300. Transverse direction 392 includes a medial transverse direction ("medial direction") extending from lateral side 308 to medial side 306 and a lateral transverse direction ("lateral direction") extending from medial side 306 to lateral side 308. A vertical direction 394 of midsole 300 extends between top surface 310 and bottom surface 312 of midsole 300. Vertical direction 394 includes an upward vertical direction ("upward direction") extending from bottom surface 312 to top surface 310 and a downward vertical direction ("downward direction") extending from top surface 310 to bottom surface 312. Top surface 310 may be considered an "upper-facing surface" and bottom surface 312 may be considered a "ground-facing surface."

Midsole 300 can be defined, in whole or in part, by a three-dimensional mesh 320. For example, in some embodiments, three-dimensional mesh 320 can define one or more of a forefoot portion 110 of midsole 300, a midfoot portion 112 of midsole 300, and/or a heel portion 114 of midsole. In some embodiments, three-dimensional mesh 320 can define all or a portion of forefoot portion 110 of midsole 300. In some embodiments, three-dimensional mesh 320 can define all or a portion of midfoot portion 112 of midsole 300. In some embodiments, three-dimensional mesh 320 can define all or a portion of heel portion 114 of midsole 300.

Similar to midsole 300, three-dimensional mesh 320 may be described as having a forefoot end 302, a heel end 304, a medial side 306, a lateral side 308, a top surface 310, and a bottom surface 312. Unless specified, a forefoot end 302, heel end 304, medial side 306, lateral side 308, top surface 310, and bottom surface 312 for a three-dimensional mesh 320 does not necessarily correspond to a forefoot end 302, heel end 304, medial side 306, lateral side 308, top surface 310, or bottom surface 312 of midsole 300. A forefoot end 302 of three-dimensional mesh 320 refers to a foremost end of three-dimensional mesh 320 and a heel end 304 of three-dimensional mesh 320 refers to a rearmost end of three-dimensional mesh 320. A medial side 306 of three-dimensional mesh 320 refers to a medial-most side of three-dimensional mesh 320 and a lateral side 308 of three-dimensional mesh 320 refers to a lateral-most side of three-dimensional mesh 320. A top surface 310 of three-dimensional mesh 320 refers to a topmost surface of three-dimensional mesh 320 and a bottom surface 312 of three-dimensional mesh 320 refers to a bottommost surface of three-dimensional mesh 320. Bottom surface 312 of three-dimensional mesh 320 can be defined by the bottom surface of three-dimensional mesh 320 that would directly contact a flat surface if three-dimensional mesh 320 was placed on the flat surface in a flat configuration.

Figure 13:
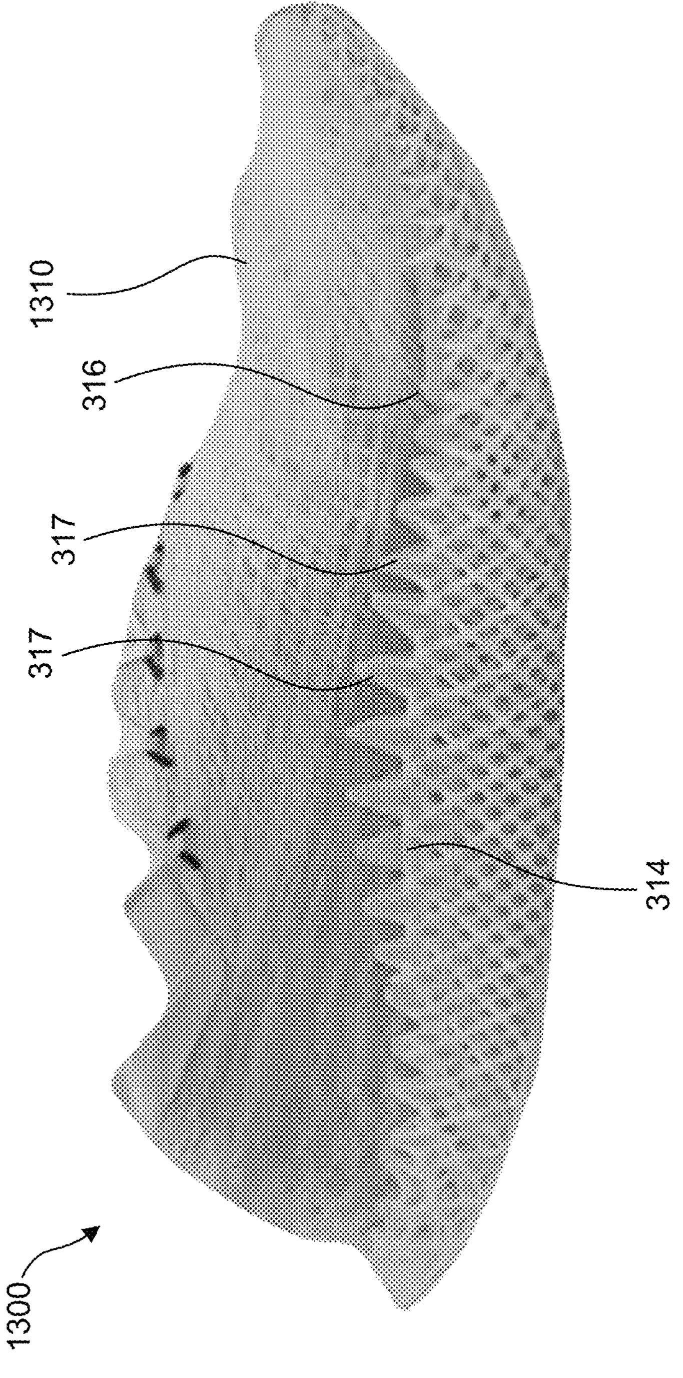
FIG. 13 is a side view of an article of footwear according to some embodiments.

In some embodiments, as shown for example in FIG. 13, midsole 300 can include a rim 314 disposed around all or a portion of the perimeter of top surface 310 of midsole 300. In some embodiments, rim 314 can be disposed around all or a portion of the perimeter of medial and lateral sides 306/308 of midsole 300. In embodiments including rim 314, rim 314 can provide stability for the perimeter of midsole 300 and/or can facilitate attachment of midsole 300 to an upper (e.g., upper 120).

In some embodiments, rim 314 can include a jagged topline 316 having a plurality of protrusions 317 as shown in FIG. 13. Protrusions 317 can extend from rim 314 such that they are disposed over portions of an upper 1310 for an article of footwear 1300. In some embodiments, protrusions 317 can be bonded to upper 1310 via, for example but not limited to, adhesive bonding, stitching or a combination thereof. In some embodiments, protrusions 317 can be in the form of V-shaped spikes extending from rim 314 and disposed over portions of upper 1310.

In some embodiments, three-dimensional mesh 320 can include struts 330 defining a jagged topline 316. In such embodiments, struts 330 defining jagged topline 316 can define protrusions 317 that extend upward such that they are disposed over portions of upper 1310. In such embodiments, protrusions 317 defined by struts 330 can be bonded to upper 1310 via, for example but not limited to, adhesive bonding, stitching or a combination thereof. In some embodiments, struts 330 defining protrusions 317 can include a plurality of struts 330 defining V-shaped spikes extending upward and disposed over portions of upper 1310. In embodiments including struts 330 defining protrusions 317, three-dimensional mesh 320 may or may not include a rim 314 disposed around all or a portion of the perimeter of top surface 310 of midsole 300.

In embodiments including jagged topline 316, jagged topline 316 can facilitate shaping of three-dimensional mesh 320 after 3-D printing. In some embodiments, three-dimensional mesh 320 can be 3-D printed such that bottom surface 312 is flat and bottom surface 312 is shaped into a curved configuration (as shown, for example, in FIG. 13) after 3-D printing. In such embodiments, jagged topline 316 can facilitate shaping of three-dimensional mesh 320 after 3-D printing by allowing three-dimensional mesh 320 to be shaped and further cured into its final shape without resulting in bucking or wrinkling at the perimeter of top surface 310. In particular, jagged topline 316 can allow for strain relief at the perimeter of top surface 310 to prevent bucking or wrinkling at the perimeter during shaping and curing.

Three-dimensional mesh 320 includes a plurality of interconnected unit cells 322. The interconnected unit cells 322 include a plurality of struts 330 defining a three-dimensional shape of a respective unit cell 322. Each unit cell 322 can have a base geometry defined by the struts 330 of the unit cell 322. As used herein "base geometry" means the base three-dimensional shape, connection, and arrangement of the struts 330 defining a unit cell 322. The base geometry of a unit cell 322 can be, but is not limited to, a dodecahedron (e.g., rhombic), a tetrahedron, an icosahedron, a cube, a cuboid, a prism, or a parallelepiped.

A plurality of struts 330 of three-dimensional mesh 320 are connected at nodes 340. The number of struts 330 that are connected at a node 340 is the "valence number" of the node 340. For example, if four struts 330 are connected at a node 340, that node 340 has a valence of four. In some embodiments, nodes 340 can have a valence number in the range of two to twelve. For example, a node 340 can have a valence number of two, three, four, five, six, seven, eight, nine, ten, eleven, or twelve, or a number within a range defined by any two of these values. In some embodiments, a node 340 can have a valence number of three or more, or four or more. In some embodiments, a node 340 can have a valence number ranging from three to twelve or four to twelve.

Figure 4:
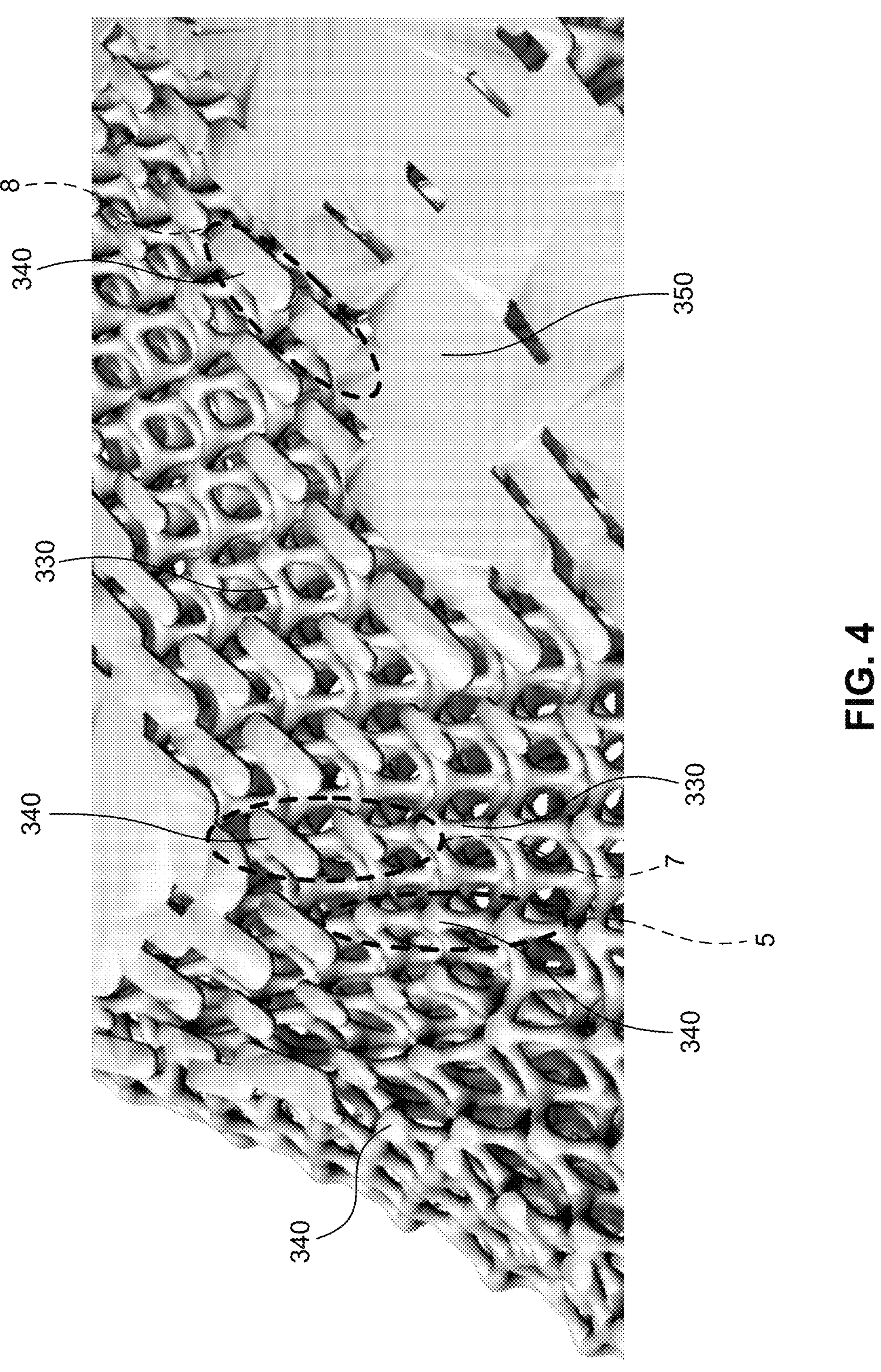
FIG. 4 is a zoomed-in view of a portion of FIG. 3.

As shown in for example FIGS. 3 and 4, bottom surface 312 of three-dimensional mesh 320 can be defined by a plurality of nodes 340 and one or more skins, for example first skin 350, second skin 352, and third skin 354. In some embodiments, bottom surface 312 of three-dimensional mesh 320 can be defined at least partially by a plurality of nodes 340. In some embodiments, a majority of bottom surface 312 can be defined by a plurality of nodes 340. In some embodiments, the entirety of bottom surface 312 can be defined by a plurality of nodes 340. In some embodiments, the entirety of bottom surface 312 can be defined by a plurality of skins.

In some embodiments, the bottom surface 312 defined by a plurality of nodes 340, one or more skins, or both a plurality of nodes 340 and one or more skins, can have a surface area equal to 33% to 66% of the full bottom gauge of midsole 300. The full bottom gauge of midsole 300 is the footprint area defined by a perimeter shape 313 of bottom surface 312. A plurality of nodes 340 and/or one or more skins having a surface area equal to 33% to 66% of the full bottom gauge of midsole 300 can, among other things, facilitate efficient 3-D printing of midsole 300 with a continuous liquid interface production process, provide sufficient surface area for attachment of an outsole, and/or provide desirable flexibility characteristics to bottom surface. In some embodiments, the bottom surface 312 defined by a plurality of nodes 340, one or more skins, or both a plurality of nodes 340 and one or more skins, can have a surface area equal to 40% to 60% of the full bottom gauge of midsole 300. In some embodiments, the bottom surface 312 defined by a plurality of nodes 340, one or more skins, or both a plurality of nodes 340 and one or more skins, can have a surface area equal to 45% to 55% of the full bottom gauge of midsole 300.

Figure 5:
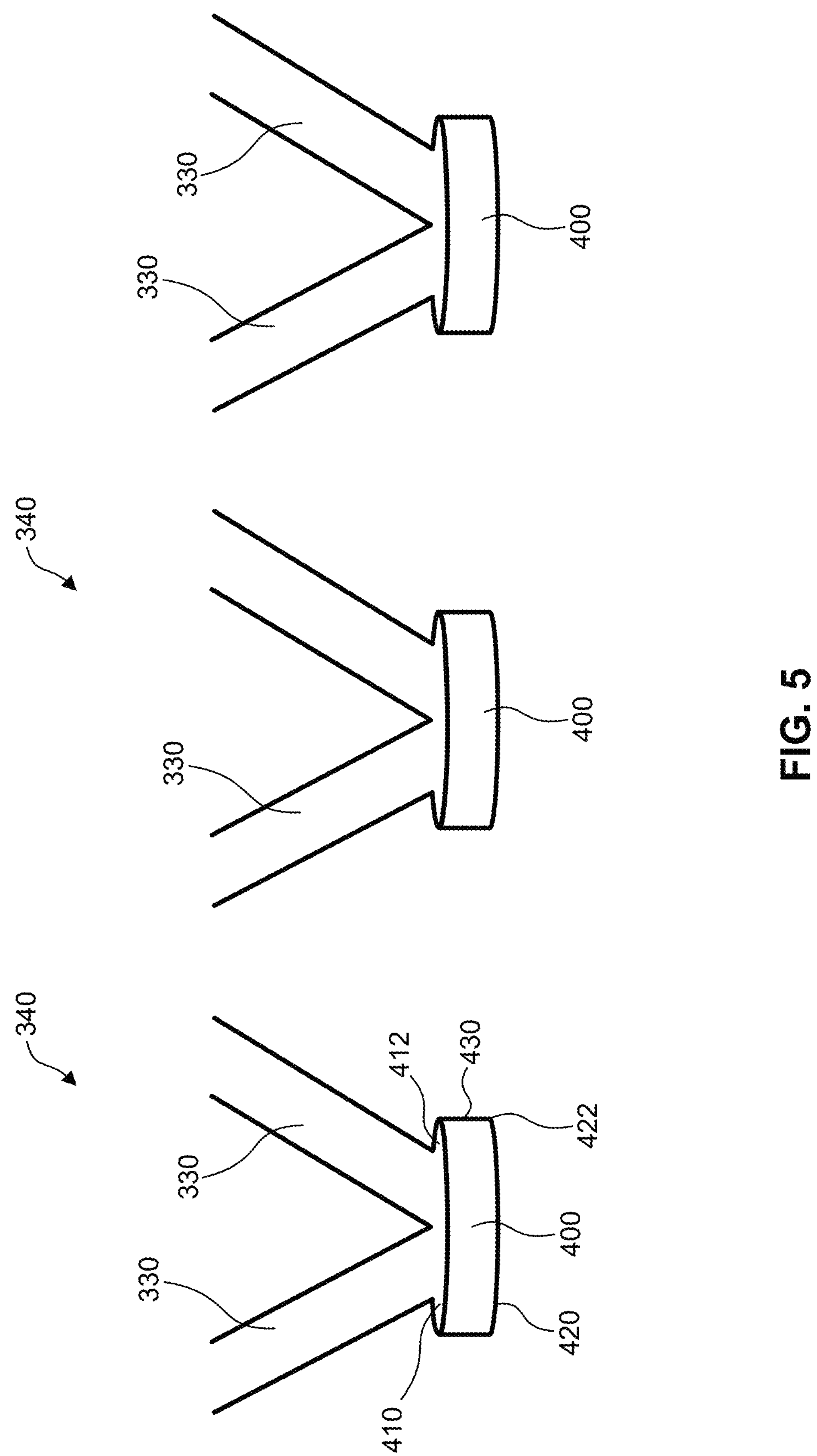
FIG. 5 is an illustration of three adjacent nodes according to some embodiments.
Figure 6:
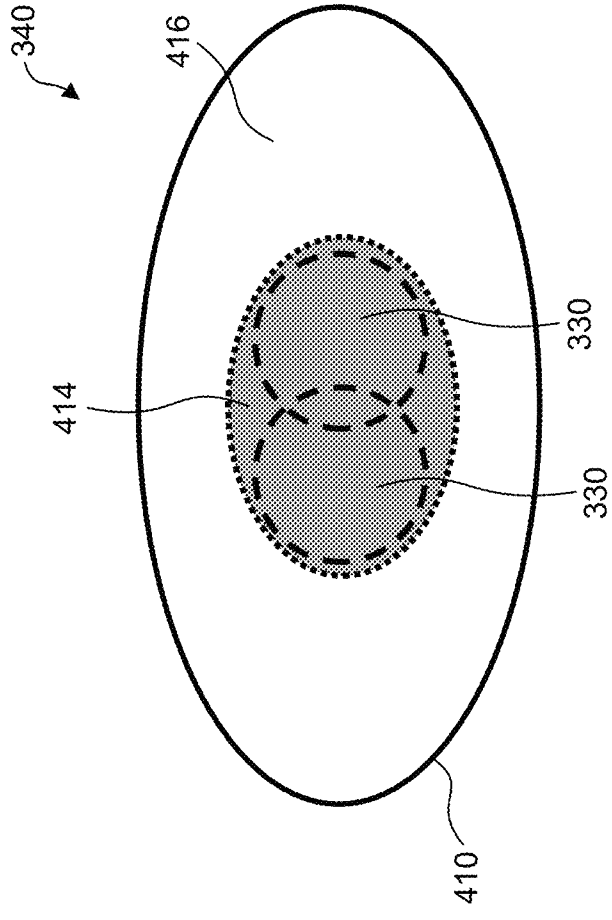
FIG. 6 is an illustration of the top platform surfaces of two nodes according to some embodiments.
Figure 6:
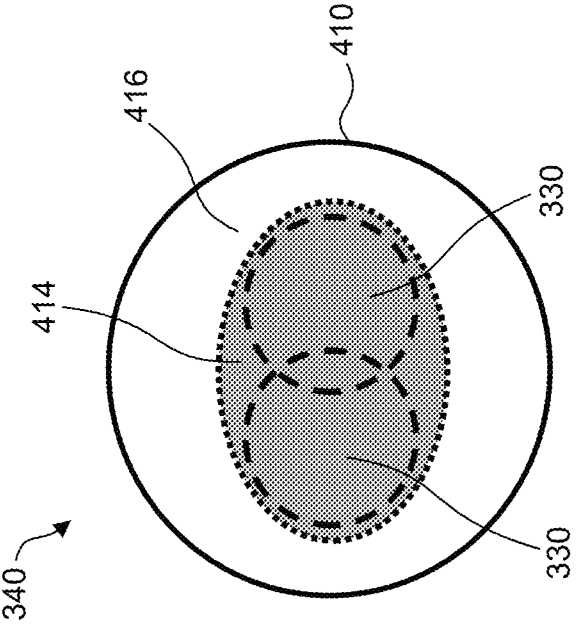
Figure 7:
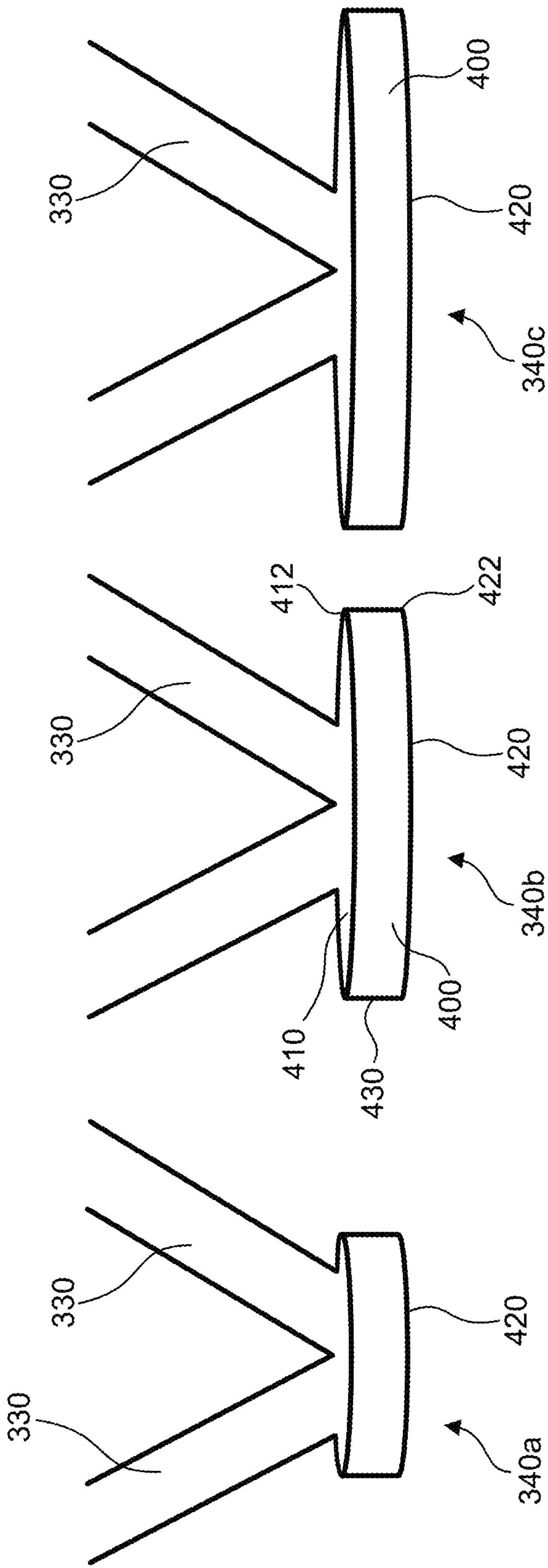
FIG. 7 is an illustration of three adjacent nodes according to some embodiments.
Figure 8:
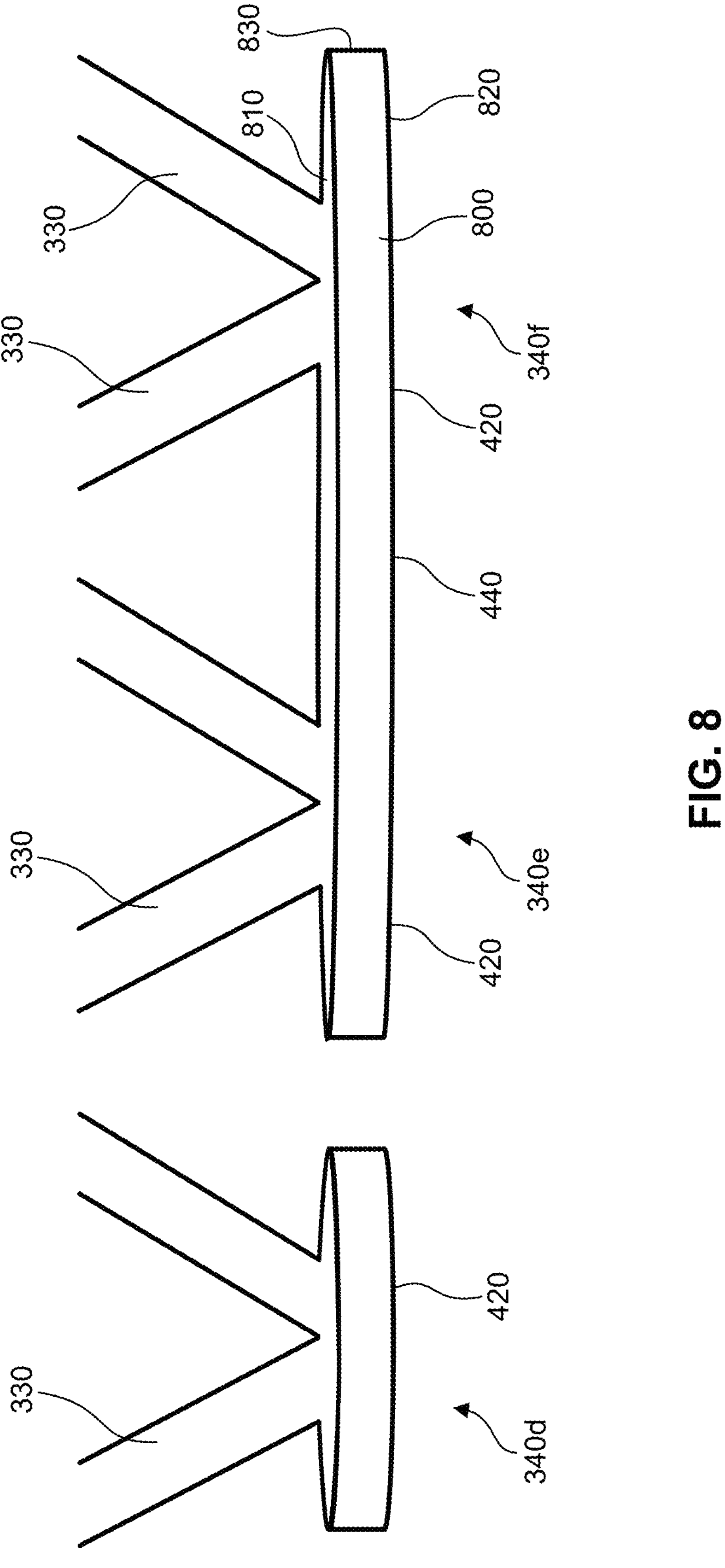
FIG. 8 is an illustration of three adjacent nodes according to some embodiments.

The arrangement and structure of the platforms 400 for nodes 340 at bottom surface 312 can be tailored produce desired characteristics for bottom surface 312 of three-dimensional mesh 320. In particular embodiments, the arrangement and structure of the platforms 400 for directly adjacent nodes 340 at bottom surface 312 can be tailored to produce desired characteristics for bottom surface 312 of three-dimensional mesh 320. FIG. 5 illustrates three directly adjacent nodes 340 in region "5" on bottom surface 312 in FIG. 4. FIG. 7 illustrates three directly adjacent nodes 340 in region "7" on bottom surface 312 in FIG. 4. FIG. 8 illustrates three directly adjacent nodes 340 in region "8" on bottom surface 312 in FIG. 4.

As shown for example in FIGS. 5-8, nodes 340 defining bottom surface 312 of three-dimensional mesh 320 can include a plurality of struts 330 connected to a platform 400. Platforms 400 of nodes 340 defining bottom surface 312 include a top platform surface 410, a bottom platform surface 420 opposite top platform surface 410, and a side surface 430 connecting top platform surface 410 and bottom platform surface 420. In some embodiments, top platform surface 410 of platforms 400 can have a top perimeter edge 412, bottom platform surface 420 of platforms 400 can have a bottom perimeter edge 422, and side surface 430 of platforms 400 connects the top perimeter edge 412 and the bottom perimeter edge 422. In some embodiments, side surface 430 can have a thickness ranging from 0.1 mm (millimeters) to 0.8 mm. In some embodiments, side surface 430 can have a thickness ranging from 0.1 mm to 0.4 mm.

The bottom platform surface 420 of each platform 400 includes a flat surface. The flat surface of bottom platform surface 420 can be perpendicular to the side surface 430 connecting top platform surface 410 and bottom platform surface 420. In some embodiments, the entirety of bottom platform surface 420 can be a flat surface. In some embodiments, the flat surface of bottom platform surfaces 420 can have a surface area of 2 $mm^2$ or more. In some embodiments, the flat surface of bottom platform surfaces 420 can have a surface area of 5 $mm^2$ or more. In some embodiments, the flat surface of bottom platform surfaces 420 can have a surface area of 7 $mm^2$ or more. In some embodiments, the flat surface of bottom platform surface 420 can be parallel to a flat surface of top platform surface 410.

A plurality of struts 330 can be directly connected to top platform surface 410 of platform 400. As used herein, the term "directly connected" means that a first component is in direct contact with a second component. A first component "directly connected" to a second component may be deposited, formed, placed, or otherwise applied directly onto the second component. In other words, if a first component is directly connected to a second component, there are no components or layers disposed between the first component and the second component. A first component described as "bonded to" a second component means that the components are bonded to each other, either by direct contact and/or bonding between the two components, or via an adhesive layer. If a first component is described as "disposed over" a second component, other layers or components may or may not be present between the first component and the second component.

In some embodiments, the plurality of struts 330 directly connected to top platform surface 410 of a platform 400 can be struts 330 of a single unit cell 322. In some embodiments, the plurality of struts 330 directly connected to a top platform surface 410 of a platform 400 can be struts 330 of two or more directly adjacent unit cells 322. For example, a first strut 330 directly connected to a top platform surface 410 can be a strut defining a portion of a first unit cell 322 and a second strut 330 directly connected to the top platform surface 410 can be a strut defining a portion of a second unit cell 322 directly adjacent the first unit cell 322.

In some embodiments, a plurality of struts 330 directly connected to top platform surface 410 of platform 400 can be directly connected to each other at platform 400. For example, a plurality of struts 330 directly connected to top platform surface 410 of platform 400 can be directly connected to each other in a central area 414 on top platform surface 410.

In some embodiments, one or more directly adjacent nodes 340 defining bottom surface 312 can be independent nodes 340 capable of moving independent of each other. In such embodiments, the side surface 430 of two directly adjacent nodes 340 defining bottom surface 312 are not connected to each other at the bottom surface 312. In some embodiments, the side surface 430 of two directly adjacent nodes 340 defining bottom surface 312 of three-dimensional mesh 320 are not connected via a strut 330 at bottom surface 312. In other words, in such embodiments, the side surface 430 of two directly adjacent nodes 340 defining bottom surface 312 of three-dimensional mesh 320 are not directly coupled to each other with a strut 330 extending from one side surface to the other side surface. This independent nature of directly adjacent nodes 340 can facilitate the formation of a bottom surface 312 with a high degree of flexibility.

As used herein, two nodes 340 described as "directly adjacent" to each other means that there is no node 340 or skin positioned between the first node 340 and the second node 340 at bottom surface 312. For two directly adjacent nodes 340 at bottom surface 312, a straight line can be drawn directly from the first node 340 to the second node 340 without crossing another node 340 or skin. Similarly, as used herein, two skins described as "directly adjacent" to each other means that there is no skin or node 340 positioned between the first skin and the second skin at bottom surface 312. For two directly adjacent skins at bottom surface 312, a straight line can be drawn directly from the first skin to the second skin without crossing another skin or node 340. Also, as used herein, two unit cells described as "directly adjacent" to each other means that there is no unit cell 322 positioned between the first unit cell 322 and the second unit cell 322. Two directly adjacent unit cells 322 at bottom surface 312 share at least one node 340 at bottom surface 312. Conversely, two unit cells described as "non-directly adjacent" to each other means that there is a unit cell 322 positioned between the first unit cell 322 and the second unit cell 322. Two non-directly adjacent unit cells 322 at bottom surface 312 do not share a node 340 at bottom surface 312.

In some embodiments, nodes 340 defining bottom surface 312 of three-dimensional mesh 320 do not comprise a strut 330 connected to side surface 430 of their respective platforms 400. In some embodiments, the plurality of struts 330 directly connected to top platform surface 410 of platforms 400 do not define a portion of the side surface 430 of the platform 400. In such embodiments, as shown for example in FIG. 6, top platform surface 410 can have a central area 414 in which the plurality of struts 330 are directly connected to top platform surface 410 and a perimeter area 416 disposed around central area 414. Perimeter area 416 can extend from central area 414 in longitudinal direction 390 and/or lateral direction 392 to define an area that surrounds all or a portion of central area 414.

In some embodiments, as shown for example in FIG. 7, a plurality of nodes 340 defining bottom surface 312 of three-dimensional mesh 320 can include a first node 340*a* having a first platform 400 with a first bottom platform surface 420 having a first surface area and a second node 340*b* directly adjacent first node 340*a* and having a second platform 400 with a second bottom platform surface 420 having a second surface area greater than the first surface area. In some embodiments, the second surface area can be 10% or more greater than the first surface area. In some embodiments, first node 340*a* can have a first platform 400 with a first bottom platform surface 420 having a first flat surface area and second node 340*b* directly adjacent first node 340*a* can have a second platform 400 with a second bottom platform surface 420 having a second flat surface area greater than the first flat surface area. In some embodiments, the second flat surface area can be 10% or more greater than the first flat surface area.

In some embodiments, the plurality of nodes 340 defining bottom surface 312 of three-dimensional mesh 320 can include a third node 340*c* directly adjacent second node 340*b* and having a third platform 400 including a third bottom platform surface 420 having a third surface area greater than the second surface area of second bottom platform surface 420. In some embodiments, the third surface area can be 10% or more greater than the second surface area. In some embodiments, third node 340*c* can have a third platform 400 including a third bottom platform surface 420 having a third flat surface area greater than the second flat surface area of second bottom platform surface 420. In some embodiments, the third flat surface area can be 10% or more greater than the second flat surface area.

In some embodiments, as shown for example in FIG. 8, a plurality of nodes 340 defining bottom surface 312 of three-dimensional mesh 320 can include a first node 340*d* having a first platform 400 with a first bottom platform surface 420, a second node 340*e* directly adjacent first node 340*d* and having a second platform 400 with a second bottom platform surface 420, and a third node 340*f* directly adjacent second node 340*e* and having a third platform 400 including a third bottom platform surface 420 merged with the second bottom platform surface 420 of second node 340*e*. In such embodiments, the third bottom platform surface 420 and the second bottom platform surface 420 form a continuous integrally formed surface 440. While FIG. 8 shows two nodes 340 merging to form continuous integrally formed surface 440, any number of nodes 340 at bottom surface 312 can merge to form integrally formed surface 440. For example, three or more, five or more, ten or more, or twenty or more nodes 340 at bottom surface 312 can merge to form integrally formed surface 440.

Integrally formed surface 440 can define all or a portion of a bottom skin surface 820 for a skin 800 as described herein. For example, as shown in FIG. 8, a portion of bottom surface 312 of the three-dimensional mesh 320 can be defined by skin 800 having a top skin surface 810, bottom skin surface 820 opposite top skin surface 810, and a plurality of struts 330 for a plurality of unit cells 322 directly connected to top skin surface 810. A side surface 830 of skin 800 can connect top skin surface 810 to bottom skin surface 820.

The bottom skin surface 820 of skin 800 can include a flat surface. The flat surface of bottom skin surface 820 can be perpendicular to the side surface 830 connecting top skin surface 810 and bottom skin surface 820. In some embodiments, the entirety of bottom skin surface 820 can be a flat surface. In some embodiments, side surface 830 can have a thickness ranging from 0.1 mm to 0.8 mm. In some embodiments, side surface 830 can have a thickness ranging from 0.4 mm to 0.8 mm. In some embodiments, side surface 830 can have a thickness that is greater than the thickness of a side surface 430 for platforms 400. For example, in some embodiments, side surface 830 can have a thickness ranging from 0.4 mm to 0.8 mm and greater than a side surface 430 having a thickness ranging from 0.1 mm to 0.4 mm.

In some embodiments, a plurality of struts 330 for a plurality of directly adjacent unit cells 322 can be directly connected to top skin surface 810. In some embodiments, a plurality of struts 330 for a plurality of non-directly adjacent unit cells 322 can be directly connected to top skin surface 810. For example, a first strut 330 directly connected to a top skin surface 810 can be a strut defining a portion of a first unit cell 322 and a second strut 330 directly connected to the top skin surface 810 can be a strut defining a portion of a second unit cell 322 not directly adjacent the first unit cell 322 at bottom surface 312.

In some embodiments, skin 810 may extend over a plurality of directly adjacent unit cells 322 at bottom surface 312. In some embodiments, skin 810 may extend over a plurality of non-directly adjacent unit cells 322 at bottom surface 312.

In some embodiments, the size of bottom platform surfaces 420 for adjacent nodes 340 at bottom surface 312 can increase across the adjacent platforms 400 such that the bottom platform surfaces of two or more of the adjacent nodes merge to form integrally formed surface 440. For example, in some embodiments, three-dimensional mesh can include the following nodes 340 arranged in a row as follows: node 340*a*, node 340*b* directly adjacent node 340*a*, node 340*c* directly adjacent node 340*b*, node 340*e* directly adjacent node 340*d*, and node 340*f* directly adjacent node 340*e*. In such embodiments, the first node 340*a* can have a first bottom platform surface 420 with a first surface area, the second node 340*b* can have a second bottom platform surface 420 with a second surface area greater than the first surface area, the third node 340*c* can have a third bottom platform surface 420 having a third surface area greater than the second surface area, and the fourth node 340*e* can have a fourth bottom platform surface 420 merged with the bottom platform surface 420 of the fifth node 340*f* to form a continuous integrally formed surface 440. By increasing the bottom platform surface area along the row of nodes 340, properties of bottom surface 312 can gradually change from independent nodes 340 to nodes 340 merged to form a continuous integrally formed surface 440. In some embodiments, the surface area of bottom platform surfaces 420 for directly adjacent nodes 340 can increase by 10% or more for each node in the row until the bottom platform surfaces 420 of two or more of the adjacent nodes 340 merge to form integrally formed surface 440.

A continuous integrally formed surface 440 for a skin 800 of three-dimensional mesh 320 may not be connected to directly adjacent nodes 340 and/or directly adjacent skins 800 not defining the continuous integrally formed surface 440 at bottom surface 312. By not being connected to directly adjacent nodes 340 and/or directly adjacent skins 800 at bottom surface 312, the skin 800 can be capable of moving independent of the directly adjacent nodes 340 and/or skins 800 such that they can move relative to each other at bottom surface 312. This independent nature of directly adjacent nodes 340 and skins 800 can facilitate the formation of a bottom surface 312 with a high degree of flexibility.

In some embodiments, three-dimensional mesh 320 can include a plurality of different skins 800, for example, skins 350, 352, and 354 shown in FIG. 3. In such embodiments, each skin includes a top skin surface 810, a bottom skin surface 820, and a plurality of struts 330 for a plurality of unit cells 322 directly connected to the top skin surface 810. For example, a first skin 350 includes a first top skin surface 810, a first bottom skin surface 820 opposite first top skin surface 810, and a plurality of struts 330 for a plurality of unit cells 322 directly connected to first top skin surface 810. Similarly, a second skin 352 includes a second top skin surface 810, a second bottom skin surface 820 opposite second top skin surface 810, and a plurality of struts 330 for a plurality of unit cells 322 directly connected to second top skin surface 810.

In some embodiments, three-dimensional mesh 320 can include plurality of skins located in different portions or sides of three-dimensional mesh 320. In some embodiments, a first skin (for example, skin 350) can be located in forefoot portion 110 of three-dimensional mesh 320 and a second skin (for example, skin 354) can be located in heel portion 114 of three-dimensional mesh 320. In some embodiments, a first skin (for example, skin 350) can be located on lateral side 308 of three-dimensional mesh 320 and a second skin (for example, skin 352) can be located on medial side 306 of three-dimensional mesh 320. In some embodiments, a first skin (for example, skin 350) can include a portion located on lateral side 308 of bottom surface 312 of three-dimensional mesh 320 and a second skin (for example, skin 352) can include a portion located on medial side 306 of bottom surface 312 of three-dimensional mesh 320.

In some embodiments, a skin can extend across different portions of three-dimensional mesh 320 and/or from medial side 306 to lateral side 308 of three-dimensional mesh 320. For example, in some embodiments, a skin (for example, skin 350) can extend from forefoot portion 110 of three-dimensional mesh 320 to midfoot portion 112 of three-dimensional mesh 320. As another example, in some embodiments, a skin (for example, skin 350) can extend from medial side 306 of three-dimensional mesh 320 to lateral side 308 of three-dimensional mesh 320.

In some embodiments, a skin does not include a rim-shape extending around the entirety of the perimeter of bottom surface 312. In other words, a skin may not include a shape that extends along the entirety of perimeter shape 313 of bottom surface 312. In some embodiments, a plurality of skins defining all or a portion of bottom surface 312 can have different shapes.

In some embodiments, one or more skins can be located in one or more high-wear areas on bottom surface 312 of three-dimensional mesh 320. For example, in some embodiments, a first skin (for example, skin 350) can be located in a first high-wear area on bottom surface 312 of three-dimensional mesh 320 and a second skin (for example, skin 354) can be located in a second high-wear area on bottom surface 312 of three-dimensional mesh 320.

In some embodiments, the location of one or more high-wear areas, and thus the location of one or more skins, can be based on biometric data for an individual or group of individuals. Such biometric data can include a biometric pressure map of areas for an individual's, or group of individuals', foot subject to different pressures or stresses during activity. For example, high stress areas can be associated with a heel portion, areas corresponding to the location of the ball of an individual's foot (i.e., at a position corresponding to a location near the anterior end of metatarsals), and a medial most portion of the individual's arch. Mild stress areas can be associated with a medial portion of the individual's arch and areas corresponding to the location of an individual's phalanges. And low stress areas can be associated with a lateral portion of the individual's arch. The size, location, and degree of stress areas for an individual will depend on, among other things, the anatomy of the individual's foot and the individual's gait. A group of individuals can be individuals classified and grouped based on four stability characteristics (pronator, mild pronator, neutral, and supinator) and four touchdown characteristics (heavy heel striker, heel striker, midfoot striker, and forefoot striker), which results in sixteen classification groups. A stability characteristic refers to how an individual's foot rolls when it contacts the ground and a touchdown characteristic refers to how an individual's foot strikes the ground.

In some embodiments, an outsole (for example, outsole 140 or outsole 900) can be coupled to bottom surface 312 of three-dimensional mesh 320. In some embodiments, the outsole can be directly coupled to bottom surface 312 of three-dimensional mesh 320. In some embodiments, an outsole (for example, outsole 140 or outsole 900) can be coupled to bottom platform surfaces 420 of a plurality of nodes 340 defining bottom surface 312 of three-dimensional mesh 320. In some embodiments, the outsole can be directly coupled to bottom platform surfaces 420 of a plurality of nodes 340 defining bottom surface 312 of three-dimensional mesh 320. In some embodiments, an outsole (for example, outsole 140 or outsole 900) can alternatively or additionally be coupled to the bottom skin surfaces 820 of one more skins 800 defining bottom surface 312 of three-dimensional mesh 320. In some embodiments, the outsole can be directly coupled to the bottom skin surfaces 820 of one more skins 800 defining bottom surface 312 of three-dimensional mesh 320.

Figure 9:
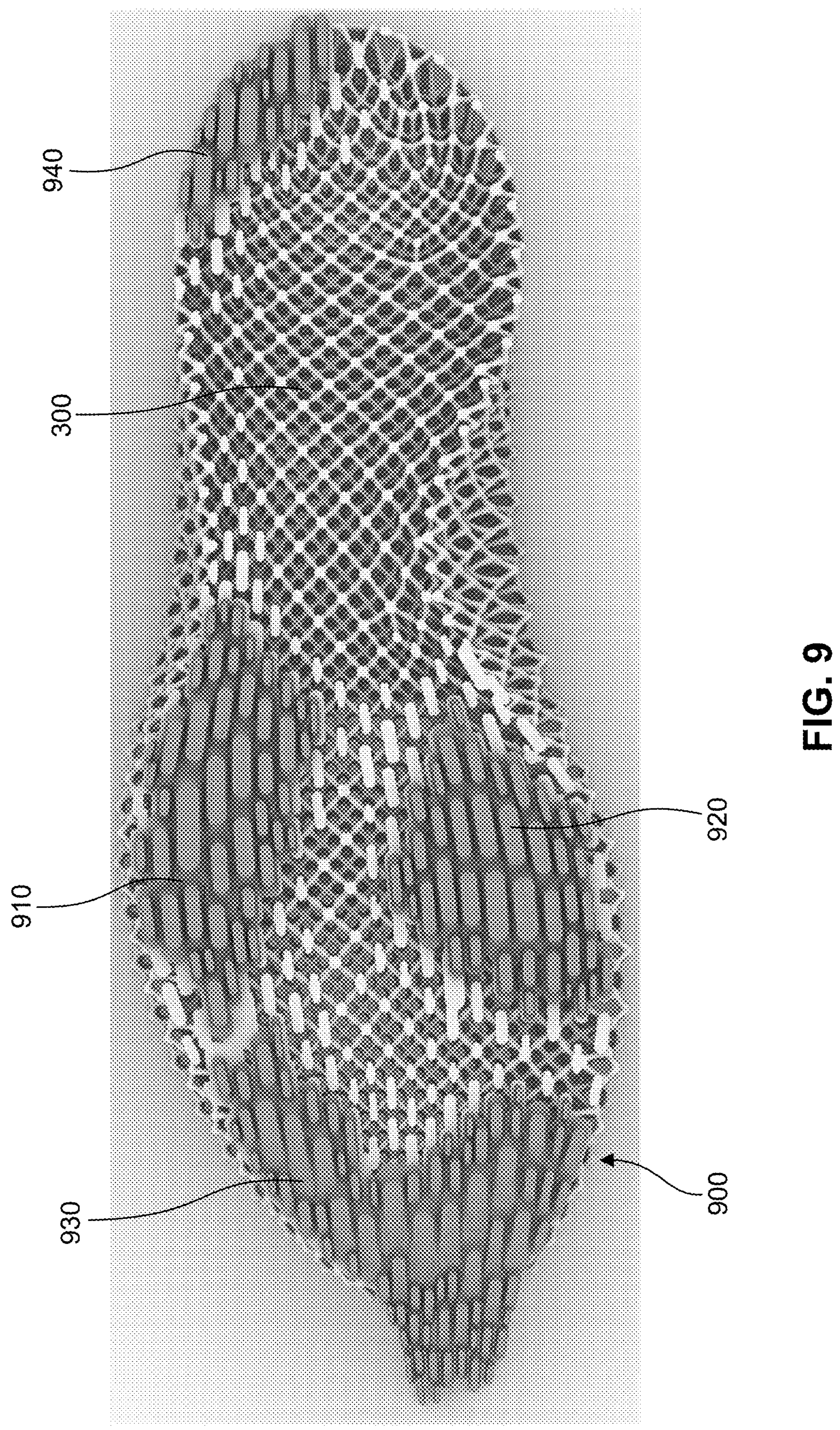
FIG. 9 is a bottom view of a sole according to some embodiments.

In some embodiments, an outsole can include a plurality of different outsole pieces coupled to different portions of bottom surface 312 of three-dimensional mesh 320. FIG. 9 shows an outsole 900 having a plurality of outsole pieces coupled to bottom surface 312 of three-dimensional mesh 320 according to some embodiments. Outsole 900 includes a first outsole piece 910, a second outsole piece 920, a third outsole piece 930, and a fourth outsole piece 940. In some embodiments, one or more of outsole pieces 910, 920, 930, 940 can be directly coupled to bottom platform surfaces 420 of a plurality of nodes 340 defining bottom surface 312 of the three-dimensional mesh 320. In some embodiments, one or more of outsole pieces 910, 920, 930, 940 can alternatively or additionally be directly coupled to the bottom skin surfaces 820 of one more skins 800 defining bottom surface 312 of three-dimensional mesh 320. For example, in some embodiments, outsole 900 can include a first outsole piece (for example, piece 910) directly coupled to a bottom skin surface of a first skin (for example, skin 350) and a second separate outsole piece (for example, piece 920) directly coupled to a bottom skin surface of a second skin (for example, skin 352).

In some embodiments, different outsole pieces of an outsole (for example, outsole pieces 910, 920, 930, 940) are not connected to each other at bottom surface 312 of three-dimensional mesh 320. In such embodiments, the different outsole pieces can be independent pieces capable of moving independent of each other.

Figure 10:
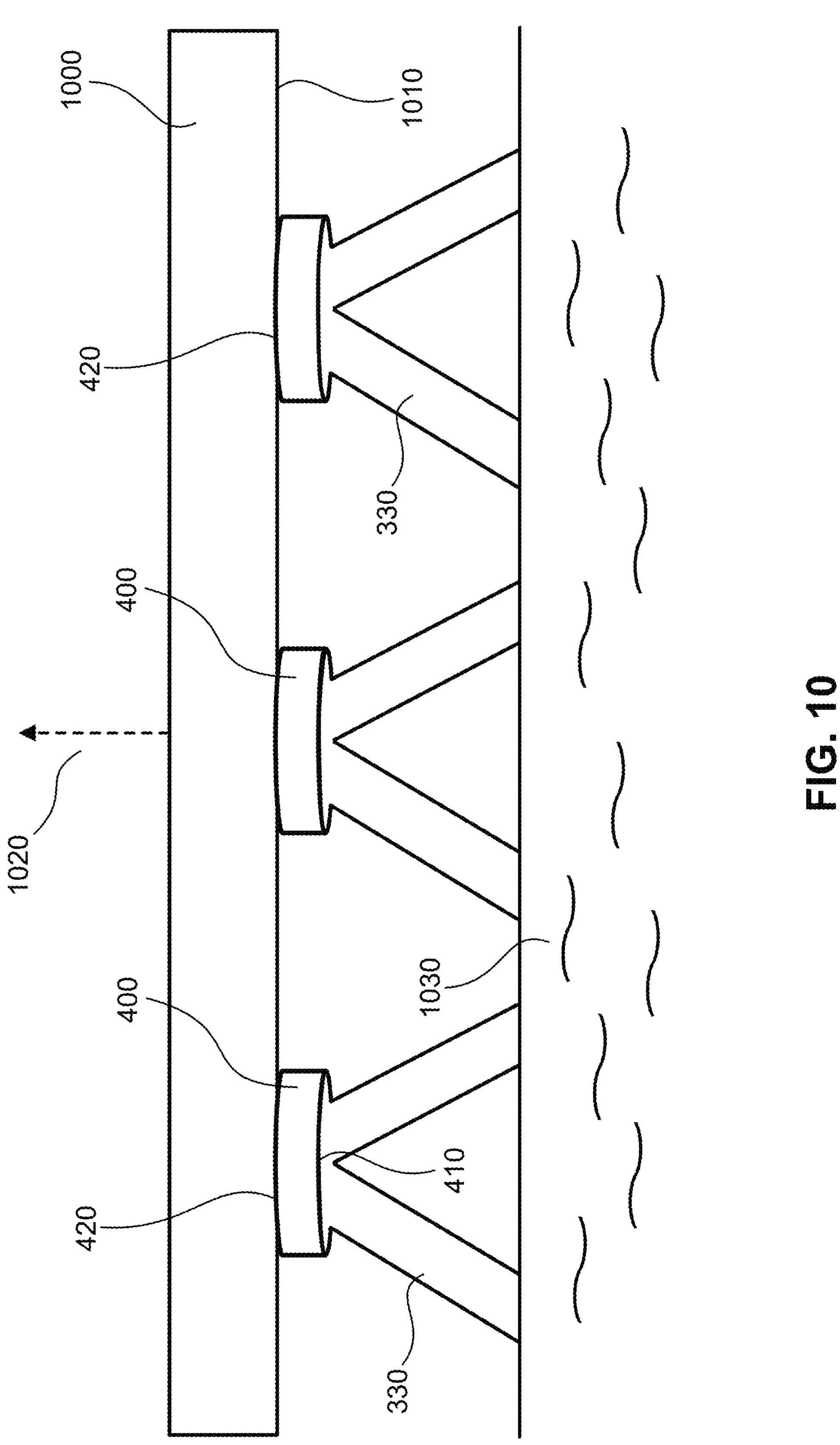
FIG. 10 shows a plurality of nodes printed on a build plate according to some embodiments.

In some embodiments, three-dimensional mesh 320 can be made using an additive manufacturing process that includes printing a plurality of interconnected unit cells 322 on a plurality of platforms 400 and/or skins 800 attached and directly connected to a build surface of a build plate. In such embodiments, as shown for example in FIG. 10, a sole for an article of footwear (for example, sole 110) can be made using a method that includes 3-D printing three-dimensional mesh 320 on a build surface 1010 of a build plate 1000. In some embodiments, 3-D printing three-dimensional mesh 320 includes printing a plurality of nodes 340 on build surface 1010 a build plate 1000, with each of the plurality of nodes 340 including a platform 400 as described herein. In some embodiments, 3-D printing three-dimensional mesh 320 includes printing one or more skins 800 on build surface 1010 a build plate 1000. After formation the platforms 400 and/or skin(s) 800, a plurality of struts 330 can be printed on top platform surfaces 410 of platforms 400 and/or top skin surface(s) 810 of skin(s) 800.

In some embodiments, as discussed herein, 3-D printing three-dimensional mesh 320 on a build surface 1010 of a build plate 1000 can include a continuous liquid interface production process. In such embodiments, platforms 400 and/or one or more skins 800 are printed on build surface 1010 with bottom platform surfaces 420 and bottom skin surface(s) 820 being attached and directly connected to build surface 1010. These surfaces are printed by curing liquid resin 1030 present in a liquid resin reservoir below build plate 1000 on build surface 1010. And, as build plate 1000 is raised upward in vertical direction 1020, platforms 400 and/or one or more skins 800 are printed, and struts 330 are printed on top platform surfaces 410 of platforms 400 and/or top skin surface(s) 810 of skin(s) 800 by curing liquid resin 1030 present in a liquid resin reservoir below build plate 1000. The liquid resin 1030 can be cured using light, for example ultraviolet light. The surface area of bottom platform surfaces 420 and bottom skin surface(s) 820 attached and directly connected to build surface 1010 can be arranged and shaped as discussed herein to reduce the chance three-dimensional mesh 320 detaches from build surface 1010 during 3-D printing and provide desired characteristics for bottom surface 312 of three-dimensional mesh 320 as discussed herein.

Figure 11A:
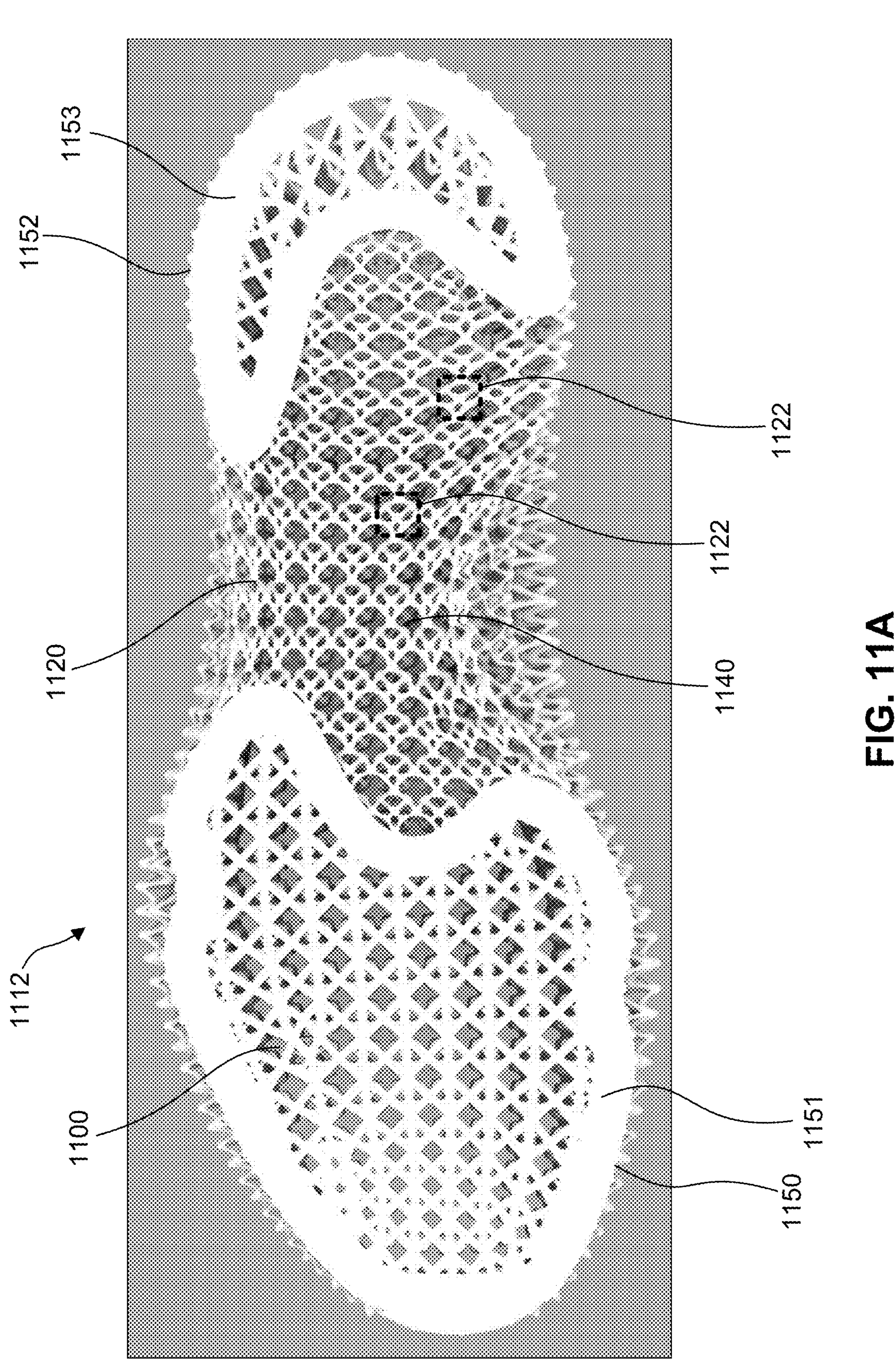
FIG. 11A is a midsole according to some embodiments.
Figure 11B:
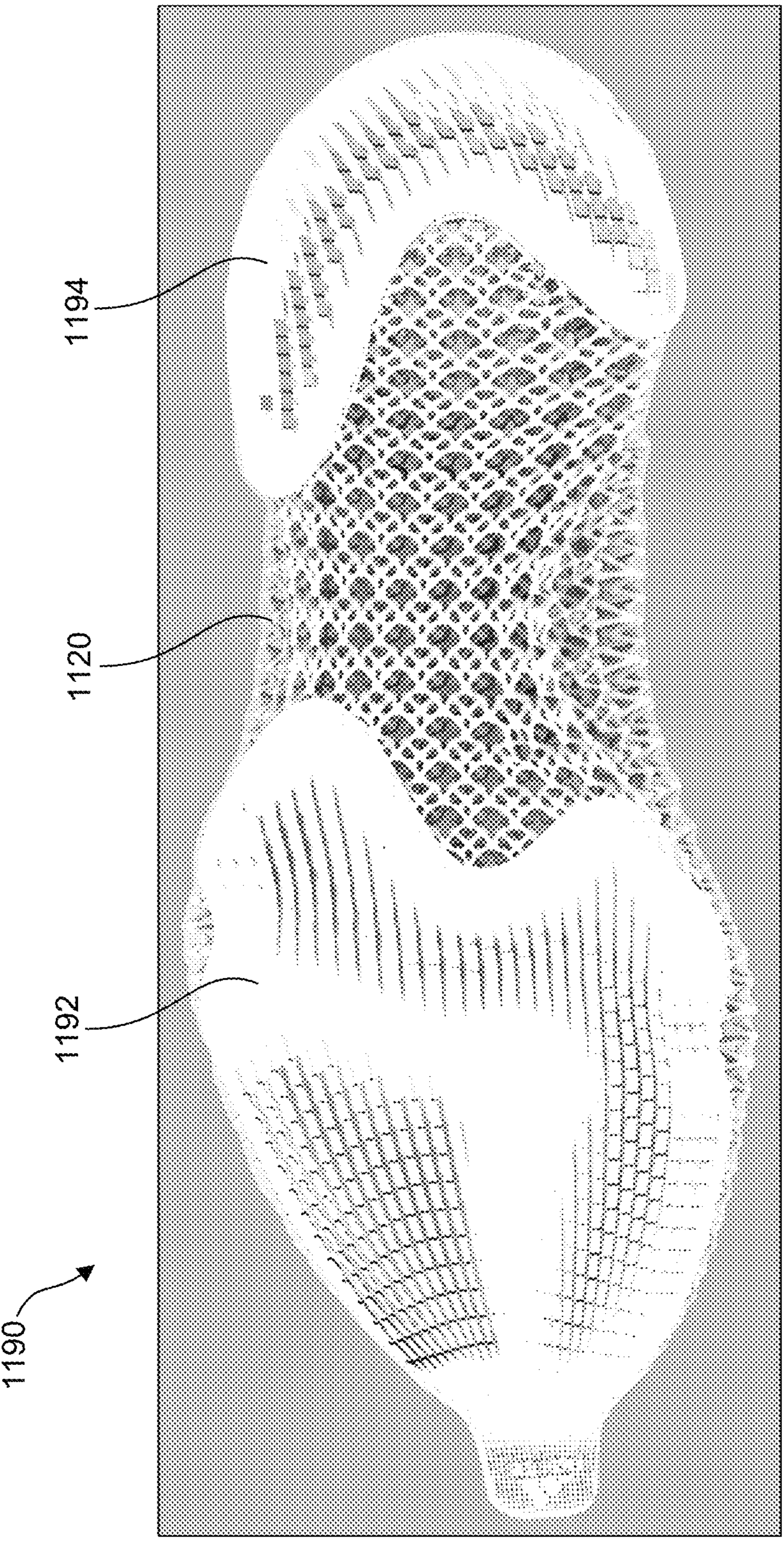
FIG. 11B is a midsole and outsole according to some embodiments.

Skins described herein can include a bottom surface with various shapes. In some embodiments, a skin can include a specific shape for facilitating attachment of one or more outsole pieces to bottom surface of a three-dimensional mesh. In some embodiments, a three-dimensional mesh can include a bottom surface with one or more skins having a perimeter frame. FIGS. 11A and 11B show a midsole 1100 including a three-dimensional mesh 1120 with a bottom surface 1112 defined by, in whole or in part, two skins 1150, 1152 having a perimeter frame according to some embodiments. Like three-dimensional mesh 320, three-dimensional mesh 1120 includes a plurality interconnected unit cells 1122.

Bottom surface 1112 of three-dimensional mesh 1120 is defined by a first skin 1150 and a second skin 1152 separated by a midfoot region 1140. First skin 1150 may not be connected to second skin 1152 at bottom surface 1112 so that first skin 1150 and second skin 1152 are capable of moving independent of each other at bottom surface 1112. First skin 1150 includes a first frame 1151 defining a perimeter shape of first skin 1150 and second skin 1152 includes a second frame 1153 defining a perimeter shape of first skin 1150.

In some embodiments, as shown in FIG. 11B, an outsole 1190 can be coupled to bottom surface 1112 of three-dimensional mesh 1120 defined by skins 1150, 1152. In some embodiments, outsole 1190 can be directly coupled to bottom surface 1112 of three-dimensional mesh 1120 defined by skins 1150, 1152. In some embodiments, outsole 1190 can include a first outsole piece 1192 directly coupled to a bottom skin surface of first skin 1150 and a second separate outsole piece 1194 directly coupled to a bottom skin surface of second skin 1152. In some embodiments, first outsole piece 1192 and second outsole piece 1194 are not connected to each other at bottom surface 1112 of three-dimensional mesh 1120. In such embodiments, the outsole pieces 1192, 1194 can be independent pieces capable of moving independent of each other.

Figure 12:
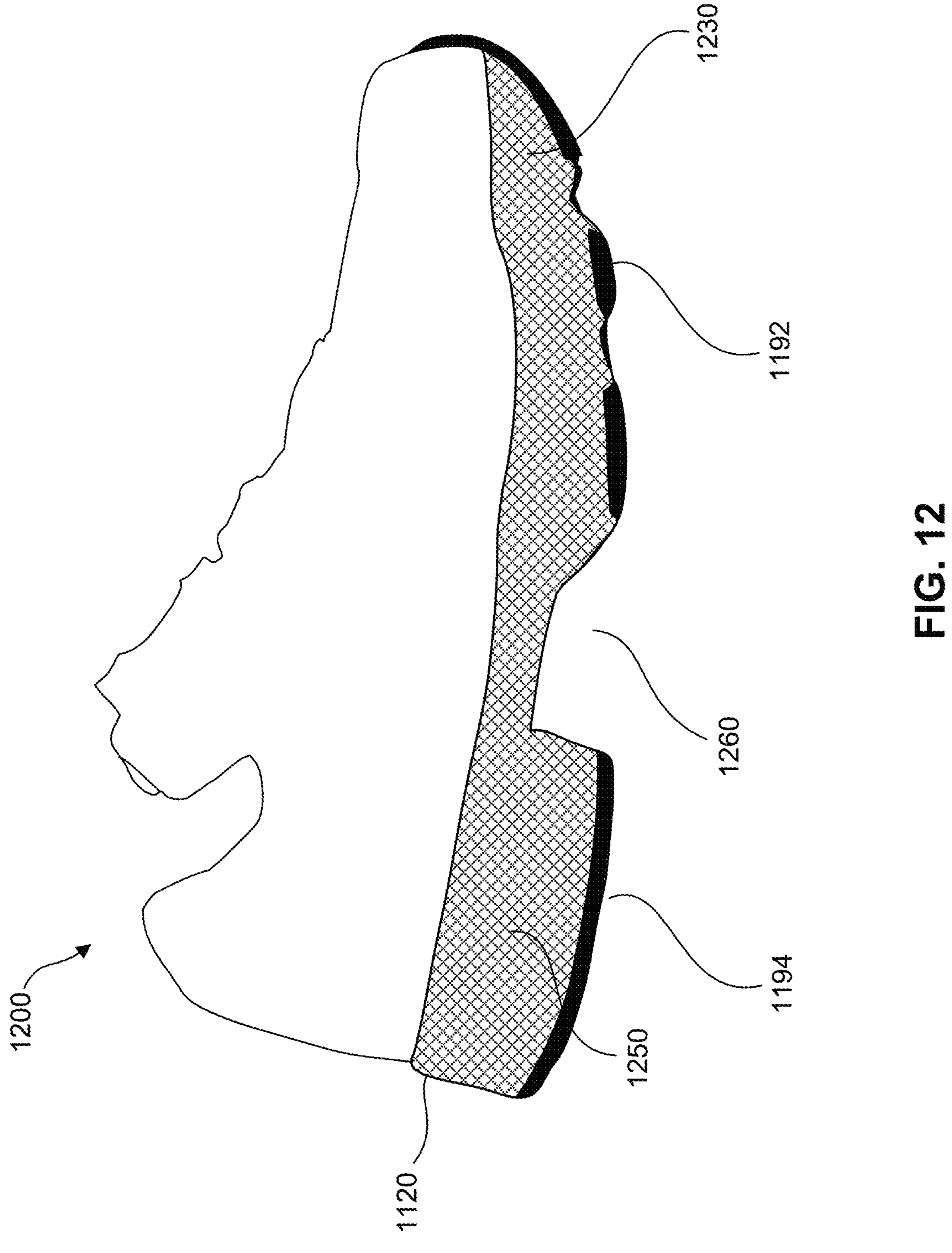
FIG. 12 is a side view of an article of footwear according to some embodiments.

In some embodiments, as shown for example in FIG. 12, three-dimensional mesh 1120 for an article of footwear 1200 can include a forefoot region 1230 having an height measured in vertical direction 394 at least twice as large as the height of midfoot region 1140 and a heel region 1250 having a height measured in vertical direction 394 at least twice as large as the height of midfoot region 1140. In some embodiments, the perimeter bottom surface of forefoot region 1230 can have a perimeter shape defined by first frame 1151. In some embodiments, the perimeter bottom surface of heel region 1250 can have a perimeter shape defined by second frame 1153. The relative height of forefoot region 1230 and heel region 1250 compared to midfoot region 1140 creates a void 1260 between forefoot region 1230 and heel region 1250 at midfoot region 1140.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A method of making a sole for an article of footwear, the method comprising:

3-D printing a three-dimensional mesh for the sole comprising a plurality of interconnected unit cells, each interconnected unit cell comprising a plurality of struts defining a three-dimensional shape and a plurality of nodes at which one or more of the plurality of struts are connected, wherein 3-D printing the three-dimensional mesh comprises:

printing a plurality of the plurality of nodes directly on a build surface of a build plate, each of the plurality of nodes comprising a platform, the platform comprising: a bottom platform surface in contact with the build surface, a top platform surface opposite the bottom platform surface, and a side surface connecting the top platform surface and the bottom platform surface; and printing a plurality of the plurality of struts directly on the top platform surface of each of the platforms, wherein the plurality of struts printed on the top platform surface of each of the platforms are directly printed in a central area of the top platform surface spaced apart from a perimeter area of the top platform surface, and wherein the plurality of struts printed on the top platform surface of each of the platforms define a portion of the interconnected unit cells.

2. The method of claim 1, wherein 3-D printing the three-dimensional mesh comprises a continuous liquid interface production process.

3. The method of claim 1, further comprising:

removing the three-dimensional mesh from the build surface; and attaching an outsole to the bottom platform surface of a plurality of the nodes.

4. The method of claim 3, wherein the outsole comprises a first outsole piece directly coupled to the bottom platform surface of a first set of the plurality of the nodes and a second outsole piece directly coupled to the bottom platform surface of a second set of the plurality of the nodes.

5. The method of claim 4, wherein the first outsole piece and the second outsole piece are not directly connected such that the first outsole piece and the second outsole piece are capable of moving independent of each other.

6. The method of claim 1, further comprising printing a skin on the build surface of the build plate, the skin comprising:

a top skin surface, a bottom skin surface opposite the top skin surface, and a plurality of struts for a plurality of the unit cells directly printed on the top skin surface.

7. The method of claim 6, wherein the skin is not connected to the plurality of platforms at a bottom surface of the three-dimensional mesh.

8. The method of claim 1, further comprising printing a first skin and a second skin on the build surface of the build plate;

wherein the first skin comprises a first top skin surface, a first bottom skin surface opposite the first top skin surface, and a plurality of struts for a plurality of the unit cells directly printed on the first top skin surface, wherein the second skin comprises a second top skin surface, a second bottom skin surface opposite the second top skin surface, and a plurality of struts for a plurality of the unit cells directly printed on the second top skin surface, and wherein the first skin, the second skin, and the plurality of platforms are not connected to each other at a bottom surface of the three-dimensional mesh.

9. The method of claim 8, wherein the first skin is located in a first high-wear area on the bottom surface of the three-dimensional mesh and the second skin is located in a second high-wear area on the bottom surface of the three-dimensional mesh.

10. The method of claim 9, wherein a location of the first high-wear area is based on a first high stress area in a biometric pressure map for an individual or a group of individuals, and wherein a location of the second high-wear area is based on a second high stress area in the biometric pressure map for the individual or the group of individuals.

11. The method of claim 8, further comprising:

removing the three-dimensional mesh from the build surface; and attaching an outsole to the first bottom skin surface and the second bottom skin surface.

12. The method of claim 11, wherein the outsole comprises a first outsole piece directly coupled to the first bottom skin surface and a second outsole piece directly coupled to the second bottom skin surface.

13. The method of claim 12, wherein the first outsole piece and the second outsole piece are not directly connected such that the first outsole piece and the second outsole piece are capable of moving independent of each other.

14. The method of claim 1, wherein the side surface of two directly adjacent nodes defining a bottom surface of the three-dimensional mesh are not connected by a strut at the bottom surface of the three-dimensional mesh such that the two directly adjacent nodes are capable of moving independent of each other.

15. The method of claim 1, wherein the side surface of two directly adjacent nodes defining a bottom surface of the three-dimensional mesh are not connected to each other at the bottom surface of the three-dimensional mesh.

16. The method of claim 1, wherein the three-dimensional mesh does not comprise a strut connected to the side surface of the platforms of the plurality of nodes directly printed on the build surface of the build plate.

17. The method of claim 1, wherein the build surface comprises a flat surface, and wherein the plurality of nodes each comprising the platform are printed on the flat surface such that a bottom surface of the three-dimensional mesh is flat on the build surface.

18. The method of claim 17, further comprising:

removing the three-dimensional mesh from the build surface;

shaping the bottom surface of the three-dimensional mesh into a curved bottom surface; and curing the three-dimensional mesh comprising the curved bottom surface.

* * * * *